(12) United States Patent
Wang et al.

(10) Patent No.: US 10,165,536 B2
(45) Date of Patent: Dec. 25, 2018

(54) SYSTEM SCANNING AND ACQUISITION

(71) Applicant: QUALCOMM Incorporated, San Diego, CA (US)

(72) Inventors: Michael Mao Wang, San Diego, CA (US); Hao Xu, San Diego, CA (US); Peter Gaal, San Diego, CA (US); Wanshi Chen, San Diego, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 203 days.

(21) Appl. No.: 15/184,977

(22) Filed: Jun. 16, 2016

(65) Prior Publication Data

US 2016/0374035 A1 Dec. 22, 2016

Related U.S. Application Data

(60) Provisional application No. 62/182,395, filed on Jun. 19, 2015.

(51) Int. Cl.
*H04W 56/00* (2009.01)
*H04J 11/00* (2006.01)

(52) U.S. Cl.
CPC ....... *H04W 56/004* (2013.01); *H04J 11/0069* (2013.01); *H04W 56/0005* (2013.01); *H04W 56/0015* (2013.01)

(58) Field of Classification Search
CPC .................. H04W 56/004; H04W 56/0005
See application file for complete search history.

(56) References Cited

U.S. PATENT DOCUMENTS

2007/0098053 A1* 5/2007 Rinne .................. H04L 5/0023
375/149
2011/0044256 A1* 2/2011 Chang ................. H04J 11/0079
370/329

(Continued)

FOREIGN PATENT DOCUMENTS

EP         2249484 A1   11/2010
WO    WO-2008042865 A2    4/2008

OTHER PUBLICATIONS

ISA/EP, International Search Report and Written Opinion of the International Searching Authority, Int'l Application No. PCT/US2016/038138, dated Aug. 31, 2016, European Patent Office, Rijswijk, NL, 12 pgs.

*Primary Examiner* — Chi Ho A Lee
(74) *Attorney, Agent, or Firm* — Holland & Hart LLP

(57) ABSTRACT

Methods, systems, and devices for wireless communication are described. A user equipment (UE) may identify a set of non-overlapping periodic intervals for monitoring a synchronization signal, which may be composed of or may include a repeated sequence; and the UE may identify possible timing structure (e.g., subframe, slot, etc.) boundaries using the intervals. The UE may then determine that one of the possible boundaries is a boundary using a second synchronization signal. For instance, the UE may perform a cumulative correlation during each of a series of correlation periods corresponding to the periodic intervals. Each of the cumulative correlations may contain multiple coherent correlations associated with the sequence repetitions. From the cumulative correlations, the UE may identify possible boundaries. The UE may perform a secondary correlation based on a second synchronization signal for each possible boundary in order to determine the system timing.

74 Claims, 20 Drawing Sheets

(56) References Cited

U.S. PATENT DOCUMENTS

| | | |
|---|---|---|
| 2011/0103534 A1 | 5/2011 | Axmon et al. |
| 2014/0169326 A1* | 6/2014 | Levanen ............... H04W 56/00 370/330 |
| 2015/0057011 A1* | 2/2015 | Di Girolamo .... H04W 74/0808 455/454 |
| 2015/0181502 A1* | 6/2015 | Hans ..................... H04W 40/22 455/437 |
| 2015/0304932 A1* | 10/2015 | Wei ..................... H04J 11/0069 370/331 |
| 2016/0013879 A1* | 1/2016 | Webb ............... H04W 56/0015 370/336 |
| 2016/0309430 A1* | 10/2016 | Chae .................... H04W 76/14 |
| 2017/0064620 A1* | 3/2017 | Wang .................... H04W 8/005 |
| 2017/0187493 A1* | 6/2017 | Lincoln ................ H04L 1/0631 |
| 2017/0223538 A1* | 8/2017 | Hahn .................... H04W 76/10 |

* cited by examiner

SYSTEM SCANNING AND ACQUISITION

CROSS REFERENCES

The present Application for Patent claims priority to U.S. Provisional Patent Application No. 62/182,395 by Wang, et al., entitled "System Scanning and Acquisition," filed Jun. 19, 2015, assigned to the assignee hereof.

BACKGROUND

The following relates generally to wireless communication, and more specifically to system scanning and acquisition.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple access communications system may include a number of base stations, each simultaneously supporting communication for multiple communication devices, which may be otherwise known as user equipment (UE).

In some cases, UEs may detect and acquire wireless system timing and information by detecting synchronization signals sent from a base station. This may involve the UE performing a correlation between a received signal and one or more predefined sequences. In some implementations, correlation may involve sampling at a large number of sample periods or at each possible sample period, which may result in highly overlapped and relatively complex correlations by the searching UE. This in turn may result in excess power consumption and computational delays at the UE.

SUMMARY

A user equipment (UE) may identify system timing and information through a multi-step process that has a reduced computational complexity relative to sampling at each possible synchronization signal sampling period. That is, a UE may avoid excessive power consumption, and thus battery drain, by using a scanning procedure without highly overlapped correlations. Such procedures may be facilitated by synchronization signals that are made up of relatively short, repeated sequences (i.e., sequences that are short and repeated relative to the sequences used for synchronization signals in some implementations). The UE may employ back-to-back correlations for the repeated sequences, which may limit sampling intervals.

By way of example, a UE may identify a set of non-overlapping periodic intervals for monitoring a synchronization signal. The synchronization signal may include or be composed of a sequence that is repeated a number of times. The UE may perform a cumulative correlation during each of a series of correlation periods corresponding to the periodic intervals (e.g., each overlapping period containing multiple non-overlapping intervals). Thus, each of the cumulative correlations may contain multiple coherent correlations associated with the sequence repetitions. Each of the coherent correlations may correspond to a single interval. From the cumulative correlations, which may correspond to an estimate of the time period of the synchronization signal, the UE may identify a set of candidates for a timing structure boundary. The UE may then determine a phase offset of the received signal and may shift the boundary of each overlapping cumulative correlation period by the phase offset. The UE may perform a secondary correlation based on a second synchronization signal for each of the timing structure boundary candidates in order to determine the system timing.

A method of wireless communication is described. The method may include receiving a first synchronization signal containing a plurality of sequence repetitions, identifying a set of candidates for a timing structure boundary based on the plurality of sequence repetitions, and determining a timing structure boundary from the set of candidates based on a second synchronization signal.

An apparatus for wireless communication is described. The apparatus may include means for receiving a first synchronization signal containing a plurality of sequence repetitions, means for identifying a set of candidates for a timing structure boundary based on the plurality of sequence repetitions, and means for determining a timing structure boundary from the set of candidates based on a second synchronization signal.

A further apparatus for wireless communication is described. The apparatus may include a processor, memory in electronic communication with the processor, and instructions stored in the memory and operable, when executed by the processor, to cause the apparatus to receive a first synchronization signal comprising a plurality of sequence repetitions, identify a set of candidates for a timing structure boundary based on the plurality of sequence repetitions, and determine a timing structure boundary from the set of candidates based on a second synchronization signal.

A non-transitory computer-readable medium storing code for wireless communication is described. The code may include instructions executable to receive a first synchronization signal of multiple sequence repetitions, identify a set of candidates for a timing structure boundary based on the multiple sequence repetitions, and determine a timing structure boundary from the set of candidates based on a second synchronization signal.

Some examples of the method, apparatuses, or non-transitory computer-readable medium described herein may further include processes, features, means, or instructions for identifying a plurality of overlapping accumulation intervals, and performing a cumulative correlation for the first synchronization signal for each of the overlapping accumulation intervals, where the set of candidates is based on the cumulative correlations. Additionally or alternatively, in some examples each of the cumulative correlations may contain a number of coherent correlations associated with the sequence repetitions.

In some examples of the method, apparatuses, or non-transitory computer-readable medium described herein, the multiple coherent correlations corresponds to a set of consecutive non-overlapping correlation intervals. Additionally or alternatively, some examples may include processes, features, means, or instructions for determining a phase offset based on the cumulative correlations, and identifying the set of candidates comprises shifting a boundary of each overlapping accumulation interval by the phase offset.

In some examples of the method, apparatuses, or non-transitory computer-readable medium described herein, the set of candidates are determined based on a magnitude for each of the cumulative correlations. Additionally or alternatively, some examples may include processes, features, means, or instructions for performing a secondary correlation for the second synchronization signal for each of the timing structure boundary candidates, where the timing structure boundary is determined based at least in part on the secondary correlations.

In some examples of the method, apparatuses, or non-transitory computer-readable medium described herein, each sequence repetition of the plurality of sequence repetitions comprises a same pseudo-random noise (PN) sequence. Additionally or alternatively, in some examples the first synchronization signal may be a periodic signal.

In some examples of the method, apparatuses, or non-transitory computer-readable medium described herein, the first synchronization signal may be a primary synchronization signal (PSS). Additionally or alternatively, in some examples the second synchronization signal may be a non-periodic signal.

In some examples of the method, apparatuses, or non-transitory computer-readable medium described herein, the second synchronization signal contains at least a portion of a secondary synchronization signal (SSS). Additionally or alternatively, in some examples the second synchronization signal contains a portion of a PSS.

Some examples of the method, apparatuses, or non-transitory computer-readable medium described herein may further include processes, features, means, or instructions for identifying a cell group based on the first synchronization signal, and identifying a cell identification (ID) based on the cell group and the second synchronization signal. Additionally or alternatively, in some examples the first synchronization signal comprises a periodic waveform selected from a set of periodic waveforms, and wherein the cell group is identified based on the periodic waveform.

In some examples of the method, apparatuses, or non-transitory computer-readable medium described herein, the second synchronization signal comprises a non-periodic waveform selected from a set of non-periodic waveforms, and wherein the cell ID is based on the non-periodic waveform. Additionally or alternatively, some examples may include processes, features, means, or instructions for identifying a cell ID based on the second synchronization signal wherein the first synchronization signal comprises a system frame number (SFN) signal.

In some examples of the method, apparatuses, or non-transitory computer-readable medium described herein, the second synchronization signal comprises a non-periodic waveform corresponding to a cell ID and is selected from a set of non-periodic waveforms. Additionally or alternatively, some examples may include processes, features, means, or instructions for receiving a third synchronization signal, and determining a cell ID based on the third synchronization signal.

In some examples of the method, apparatuses, or non-transitory computer-readable medium described herein, the first synchronization signal comprises a single frequency network signal, the second synchronization signal comprises a non-periodic waveform corresponding to a cell group and is selected from a first set of non-periodic waveforms, and the third synchronization signal comprises a non-periodic waveform corresponding to a cell ID and is selected from a second set of non-periodic waveforms.

A further method of wireless communication is described. The method may include transmitting a first synchronization signal comprising a plurality of sequence repetitions, wherein the first synchronization comprises a periodic waveform, and transmitting a second synchronization signal comprising a non-periodic waveform.

A further apparatus for wireless communication is described. The apparatus may include means for transmitting a first synchronization signal comprising a plurality of sequence repetitions, wherein the first synchronization comprises a periodic waveform, and means for transmitting a second synchronization signal comprising a non-periodic waveform.

A further apparatus for wireless communication is described. The apparatus may include a processor, memory in electronic communication with the processor, and instructions stored in the memory and operable, when executed by the processor, to cause the apparatus to transmit a first synchronization signal containing a plurality of sequence repetitions, wherein the first synchronization may be a periodic waveform, and transmit a second synchronization signal of a non-periodic waveform.

A further non-transitory computer-readable medium storing code for wireless communication is described. The code may include instructions executable to transmit a first synchronization signal comprising a plurality of sequence repetitions, wherein the first synchronization comprises a periodic waveform, and transmit a second synchronization signal comprising a non-periodic waveform.

In some examples of the method, apparatuses, or non-transitory computer-readable medium described herein, the periodic waveform of the first synchronization signal corresponds to a cell group and is selected from a set of periodic waveforms, and the non-periodic waveform of the second synchronization signal corresponds to a cell ID and is selected from a set of non-periodic waveforms. Additionally or alternatively, in some examples the periodic waveform of the first synchronization signal comprises a single frequency network signal, and the non-periodic waveform of the second synchronization signal corresponds to a cell ID and is selected from a set of non-periodic waveforms.

Some examples of the method, apparatuses, or non-transitory computer-readable medium described herein may further include processes, features, means, or instructions for receiving a third synchronization signal comprising a non-periodic waveform, the periodic waveform of the first synchronization signal contains a single frequency network signal, the non-periodic waveform of the second synchronization signal corresponds to cell group and is selected from a first set of non-periodic waveforms, and the non-periodic waveform of the third synchronization signal corresponds to a cell ID and is selected from a second set of non-periodic waveforms.

BRIEF DESCRIPTION OF THE DRAWINGS

Aspects of the disclosure are described in reference to the following figures.

DETAILED DESCRIPTION

Figure 1:
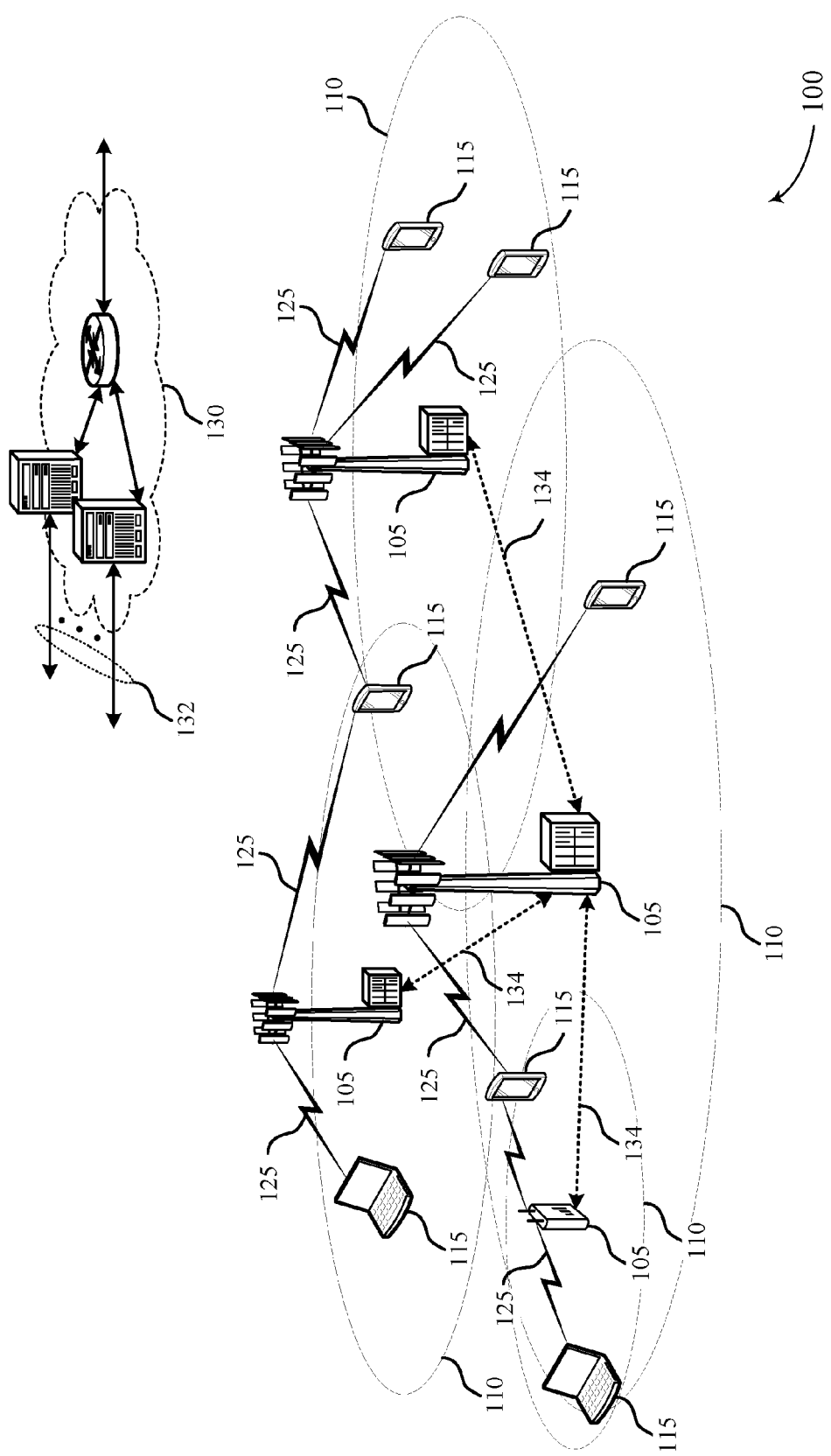
FIG. 1 illustrates an example of a wireless communications system that supports system scanning and acquisition in accordance with various aspects of the present disclosure.

A user equipment (UE) may perform a network acquisition procedure when looking for an initial system to camp on (e.g., after powering on), looking for a new system (e.g., after leaving the coverage of the current serving system), or looking for a preferred system when roaming into a new area (e.g., a new country). Searching for a system may include performing a full carrier frequency scan by detecting the synchronization signals transmitted by a base station, such as the primary synchronization signal (PSS) and secondary synchronization signal (SSS), at a given frequency raster (e.g., 100 kHz) and at all potential timing positions on that frequency. Detecting a synchronization signal may include performing a correlation between a received signal and one or more predefined sequences. In some cases, a new correlation may be performed at every sample period defined for the system. Such highly overlapped, complex searching by the UE may result in excess power consumption and computational delays. More efficient system scanning and acquisition may be achieved by reducing the complexity of the correlation process.

A simplified synchronization process may be performed using a synchronization signal that is composed of multiple short sequences repeated at regular intervals. A synchronization signal based on repeated sequences may enable a UE to perform simplified correlations at intervals longer than the sampling period. The correlation performed at each interval may involve a series of cumulative, coherent sub-correlations. The sub-correlations may involve a comparison between the signal received during each interval and the predefined repeated sequences in the synchronization signal. The sub-correlations may be performed over consecutive non-overlapping intervals that may not be aligned with the intervals at which the synchronization sequence is repeated.

Thus, the timing of the synchronization signal (e.g., the PSS) may be periodic with m repetitions of the same short pseudo-random number (PN) sequence. A UE may perform back-to-back correlations using Fast Fourier Transforms (FFTs) and may coherently accumulate m consecutive correlation outputs, which may minimize or eliminate the need for sample level alignments to obtain a sufficient correlation. As explained in further detail below, a relative maximum position within the PSS period may be used as an estimation of coarse timing for the synchronization signal and may correspond to a cyclically shifted PN sequence. The coarse timing may then be used to estimate the frequency offset. This may negate the need for PSS correlation at each sample level, may result in the desired detection of PN boundaries, and may reduce search complexity.

Following the estimation of the coarse timing, a non-periodic synchronization signal (e.g. the SSS) may be used to determine the boundary between the periodic synchronization signal and non-periodic synchronization signal (e.g., a boundary corresponding to a system timing structure boundary). The UE (e.g., a PSS detector of the UE) may determine possible boundaries of the periodic synchronization signal, which may be represented as values with different magnitudes of the PN sequence. That is, the values with significantly large magnitudes may represent the potential synchronization timing boundaries used to enable correlation. As discussed below, this process may include an SSS down search and M-part correlation, for example. This process may result in reduced frequency error and increased coherence time for the non-periodic synchronization signal (e.g., SSS).

In some cases, back-to-back correlation may be used in different configurations for various wireless communication systems. In one example, the PSS may provide coarse timing and cell group information (e.g., consisting of three periodic waveforms, which represent three cell groups). The corresponding SSS may be one of multiple non-periodic waveforms that may be used for fine tuning and cell identification (ID) and may be cell specific (e.g., representing a number of cell IDs). In another example, coarse timing may be provided by the PSS consisting of one periodic waveform, such as a single frequency network signal with improved spatial diversity.

In other examples, PSS may be split into a coarse timing PSS (PSS-C) and refined timing PSS (PSS-R). PSS-C may consist of one unique periodic waveform with a single frequency network signal. PSS-R may consist of multiple non-periodic waveforms representing three cell groups and may have three blind detections. SSS in such cases may have multiple non-periodic waveforms representing multiple cell IDs and may also correspond to multiple blind detections, for example.

Aspects of the disclosure are further described below in the context of an exemplary wireless communication system. Specific examples are then described for system acquisition using a synchronization signal based on a repeated sequence as well as a number of alternative synchronization signal formats. These and other aspects of the disclosure are further illustrated by and described with reference to apparatus diagrams, system diagrams, and flowcharts that relate to system scanning and acquisition.

FIG. 1 illustrates an example of a wireless communications system 100 that supports system scanning and acquisition in accordance with various aspects of the present disclosure. The wireless communications system 100 includes base stations 105, user equipment (UEs) 115, and a core network 130. In some examples, the wireless communications system 100 may be a Long Term Evolution (LTE)/LTE-Advanced (LTE-A) network. Wireless communications system 100 may enable UEs 115 to conserve power by performing a modified cell acquisition procedure. For example, a base station 105 may transmit a synchronization signal including a short, repeated sequence, and UEs 115 may perform a simplified correlation based on the repeated sequence.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal, a handset, a user agent, a client, or some other suitable terminology. A UE 115 may also be a cellular phone, a wireless modem, a handheld device, a personal computer, a tablet, a personal electronic device, a machine type communication (MTC) device, or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

Some types of wireless devices, including certain UEs 115, may provide for automated communication. Automated wireless devices may include those implementing Machine-to-Machine (M2M) communication or Machine Type Communication (MTC). M2M or MTC may refer to data communication technologies that allow devices to communicate with one another or a base station without human intervention. For example, M2M or MTC may refer to communications from devices that integrate sensors or meters to measure or capture information and relay that information to a central server or application program that may make use of the information or present the information to humans interacting with the program or application. Some UEs 115 may be MTC devices, such as those designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. An MTC device may operate using half-duplex (one-way) communications at a reduced peak rate. MTC devices may also be configured to enter a power saving "deep sleep" mode when not engaging in active communications. MTC devices in particular may benefit from power conservation techniques because they may be deployed in environments that do not readily support re-charging. In some cases, MTC devices may utilize coverage enhancement techniques and techniques designed to conserve battery power (e.g., a simplified synchronization process). Additionally, MTC devices may utilize the techniques described herein to limit excessive power consumption associated with system acquisition and timing.

A UE 115 attempting to access a wireless network may perform an initial cell search by detecting a PSS from a base station 105. The PSS may enable synchronization of slot timing and may indicate a physical layer identity value. The UE 115 may then receive an SSS. The SSS may enable radio frame synchronization, and may provide a cell identity value, which may be combined with the physical layer identity value to identify the cell. The SSS may also enable detection of a duplexing mode and a cyclic prefix length. Some systems, such as time division duplex (TDD) systems, may transmit a PSS but not an SSS, or vice versa. Both the PSS and the SSS may be located in the central subcarriers (e.g., 62 and 72 subcarriers) of a carrier, respectively. In some cases, a UE 115 may acquire the synchronization signals by performing a correlation that includes combining a series of cumulative, coherent sub-correlations, where the sub-correlations may involve a comparison between the signal received during each interval and the predefined repeated sequences in the synchronization signal.

After completing initial cell synchronization, the UE 115 may receive a master information block (MIB) and may decode the MIB. The MIB may contain system bandwidth information, a system frame number (SFN), and a physical hybrid automatic repeat request (HARD) indicator channel (PHICH) configuration. The MIB may be transmitted on physical broadcast channel (PBCH) and may utilize the first 4 orthogonal frequency division multiple access (OFDMA) symbols of the second slot of the first subframe of each radio frame. It may use the middle 6 resource blocks (72 subcarriers) in the frequency domain. The MIB carries a few important pieces of information for UE initial access, including: downlink channel bandwidth in term of resource blocks, PHICH configuration (duration and resource assignment), and SFN. A new MIB may be broadcast every fourth radio frame (SFN mod 4=0) and rebroadcast every frame (10 ms). Each repetition is scrambled with a different scrambling code. After reading a MIB (either a new version or a copy), the UE 115 may try different phases of a scrambling code until it gets a successful cyclic redundancy check (CRC). The phase of the scrambling code (0, 1, 2 or 3) may enable the UE 115 to identify which of the four repetitions has been received. Thus, the UE 115 may determine the current SFN by reading the SFN in the decoded transmission and adding the scrambling code phase.

After decoding the MIB, the UE 115 may receive one or more system information block (SIBs). For example, SIB1 may contain cell access parameters and scheduling information for other Ms. Decoding SIB1 may enable the UE 115 to receive SIB2. SIB2 may contain radio resource control (RRC) configuration information related to random access channel (RACH) procedures, paging, physical uplink control channel (PUCCH), physical uplink shared channel (PUSCH), power control, SRS, and cell barring. The UE 115 may thus decode SIB1 and SIB2 prior to accessing the network. Different SIBs may be defined according to the type of system information conveyed. A new SIB1 may be transmitted in the fifth subframe of every eighth frame (SFN mod 8=0) and rebroadcast every other frame (20 ms). SIB1 includes access information, including cell identity information, and it may indicate whether a UE is allowed to camp on a cell of a base station 105. SIB1 also includes cell selection information (or cell selection parameters). Additionally, SIB1 includes scheduling information for other SIBs. SIB2 may be scheduled dynamically according to information in SIB1, and includes access information and parameters related to common and shared channels. The periodicity of SIB2 may be set to 8, 16, 32, 64, 128, 256 or 512 radio frames.

After the UE 115 decodes SIB2, it may transmit a RACH preamble to a base station 105. This may be known as RACH message 1. For example, the RACH preamble may be randomly selected from a set of 64 predetermined sequences. This may enable the base station 105 to distinguish between multiple UEs 115 trying to access the system simultaneously. The base station 105 may respond with a random access response (RAR), or RACH message 2, that may provide an uplink resource grant, a timing advance and a temporary cell radio network temporary identity (C-RNTI). The UE 115 may then transmit an RRC connection request, or RACH message 3, along with a temporary mobile subscriber identity (TMSI) (e.g., if the UE 115 has previously been connected to the same wireless network) or a random identifier. The RRC connection request may also indicate the reason the UE 115 is connecting to the network (e.g., emergency, signaling, data exchange, etc.). The base station 105 may respond to the connection request with a contention resolution message, or RACH message 4, addressed to the UE 115, which may provide a new C-RNTI. If the UE 115 receives a contention resolution message with the correct identification, it may proceed with RRC setup. If the UE 115 does not receive a contention resolution message (e.g., if there is a conflict with another UE 115) it may repeat the RACH process by transmitting a new RACH preamble.

In accordance with the present disclosure, a UE 115 (such as an MTC device) may scan and acquire system timing and information by identifying a set of non-overlapping periodic intervals for monitoring a synchronization signal. The synchronization signal may include a sequence that is repeated a number of times. The UE 115 may perform a cumulative correlation during each of a series of correlation periods corresponding to the periodic intervals (e.g., each overlapping period containing multiple non-overlapping intervals). Thus, each of the cumulative correlations may contain multiple coherent correlations associated with the sequence repetitions. Each of the coherent correlations may correspond to a single interval. From the cumulative correlations (which may correspond to an estimate of the time period of the synchronization signal), the UE 115 may identify a set of candidates for a timing structure boundary. The UE may then determine a phase offset of the received signal and may shift the boundary of each overlapping cumulative correlation period by the phase offset. The UE 115 may perform a secondary correlation based on a second synchronization signal for each of the timing structure boundary candidates in order to determine the system timing. Once the UE 115 has acquired system timing, it may proceed to decode system information and access the system 100.

Figure 2:
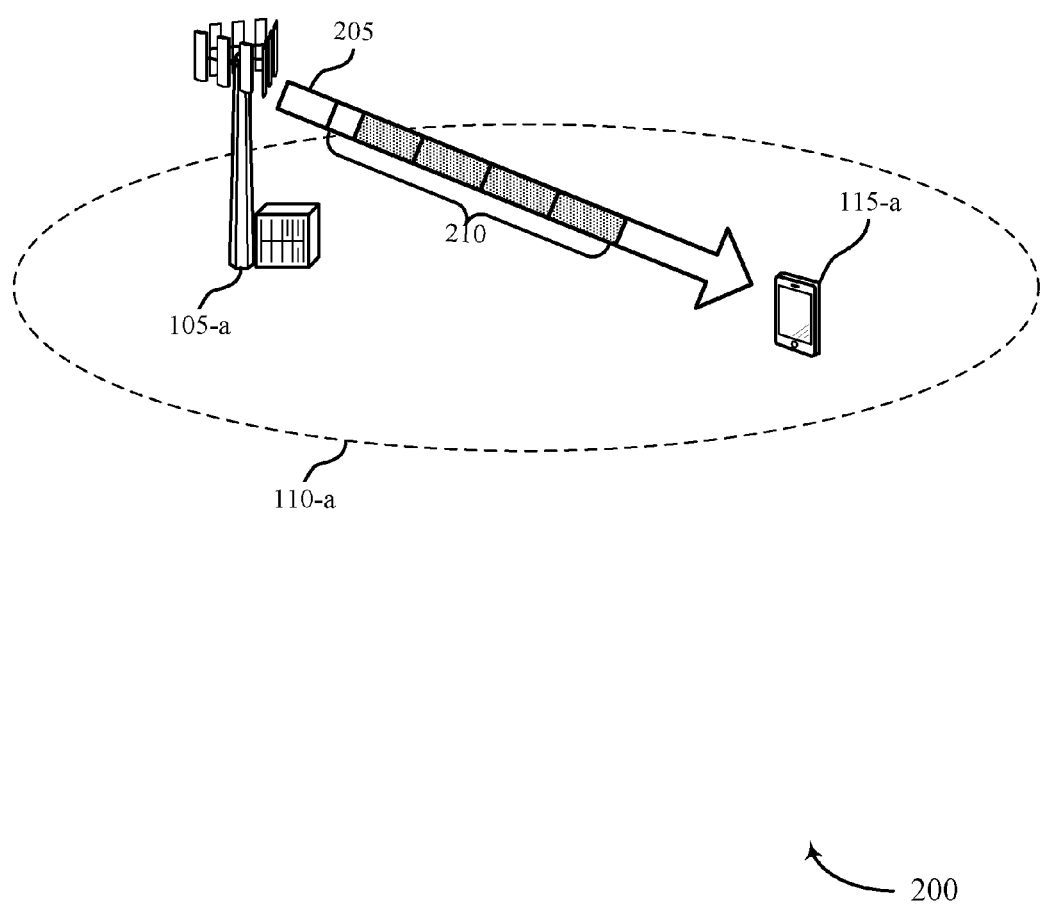
FIG. 2 illustrates an example of a wireless communications system that supports system scanning and acquisition in accordance with various aspects of the present disclosure.

FIG. 2 illustrates an example of a wireless communications system 200 that supports system scanning and acquisition in accordance with various aspects of the present disclosure. Wireless communications system 200 may include a UE 115-*a* and base station 105-*a*, which may be examples of a UE 115 base station 105 described with reference to FIG. 1. In some cases, UE 115-*a* may conserve power by performing a modified cell acquisition procedure. For example, base station 105-*a* may transmit a PSS including a repeated sequence, and UE 115-*a* may perform a simplified correlation based on the repeated sequence.

That is, UE 115-*a* may synchronize with base station 105-*a* by detecting synchronization signals such as PSS and SSS. In some cases, synchronization may include performing a correlation between a received signal and one or more predefined sequences. In some cases, a new correlation may be performed at every sample period, but this may involve highly-overlapped and relatively complex correlations by UE 115-*a*.

A simplified synchronization process, as discussed above, may therefore be performed using a synchronization signal that is composed of multiple short sequences repeated at regular intervals. A synchronization signal based on repeated sequences may enable UE 115-*a* to perform simplified correlations at intervals longer than the sampling period. The correlation performed at each interval may involve a series of cumulative, coherent sub-correlations. The sub-correlations may involve a comparison between the signal received during each interval and the predefined repeated sequences in the synchronization signal. The sub-correlations may be performed over consecutive non-overlapping intervals that may not be aligned with the intervals at which the synchronization sequence is repeated.

Thus, the timing of the synchronization signal (e.g., the PSS) may be periodic with m repetitions of the same short PN sequence of length $N_{PN}$, (e.g., $N_{PN}$=128). The detector may perform back-to-back correlations using $N_{PN}$-FFT and may coherently accumulate m consecutive correlation outputs, which may eliminate the need for sample level alignments to obtain a sufficient correlation. The relative maximum position within the PSS period may be used as an estimation of coarse timing for the synchronization signal and may correspond to a cyclically shifted PN sequence. The coarse timing may then be used to estimate the frequency offset. This may negate the need for PSS correlation at each sample level, result in the desired detection of PN boundaries, and reduce search complexity.

Following the estimation of the coarse timing, the non-periodic SSS may be used to determine the PSS boundary. The PSS detector output may be represented as values with different magnitudes of the PN sequence. The values with significantly large magnitudes may represent the potential SSS timing positions to enable correlation. This may be accomplished through an SSS down search and M-part correlation, for example. This may result in reduced frequency error and increased coherence time for SSS.

In some cases, back-to-back correlation may be used in different configurations for various wireless communication systems. In one example, the PSS may provide coarse timing and cell group information (e.g., consisting of three periodic waveforms which represent three cell groups). The corresponding SSS may consist of, e.g., 168 non-periodic waveforms that may be used for fine tuning and cell ID, and may be cell specific (e.g., representing 168 cell IDs). In another example, coarse timing may be provided by the PSS consisting of one periodic waveform, which may include an single frequency network indication. In this example the SSS may provide fine tuning and cell ID through, e.g., 3×168 non-periodic waveforms (i.e., representing 504 cell IDs). In a third example, PSS may be split into a PSS-C and PSS-R. PSS-C may consist of one unique periodic waveform with a single frequency network signal. PSS-R may consist of three non-periodic waveforms representing three cell groups and may have three blind detections. SSS in this example may have, e.g., 168 non-periodic waveforms representing 168 cell IDs and may also correspond to 168 blind detections.

Figure 3:
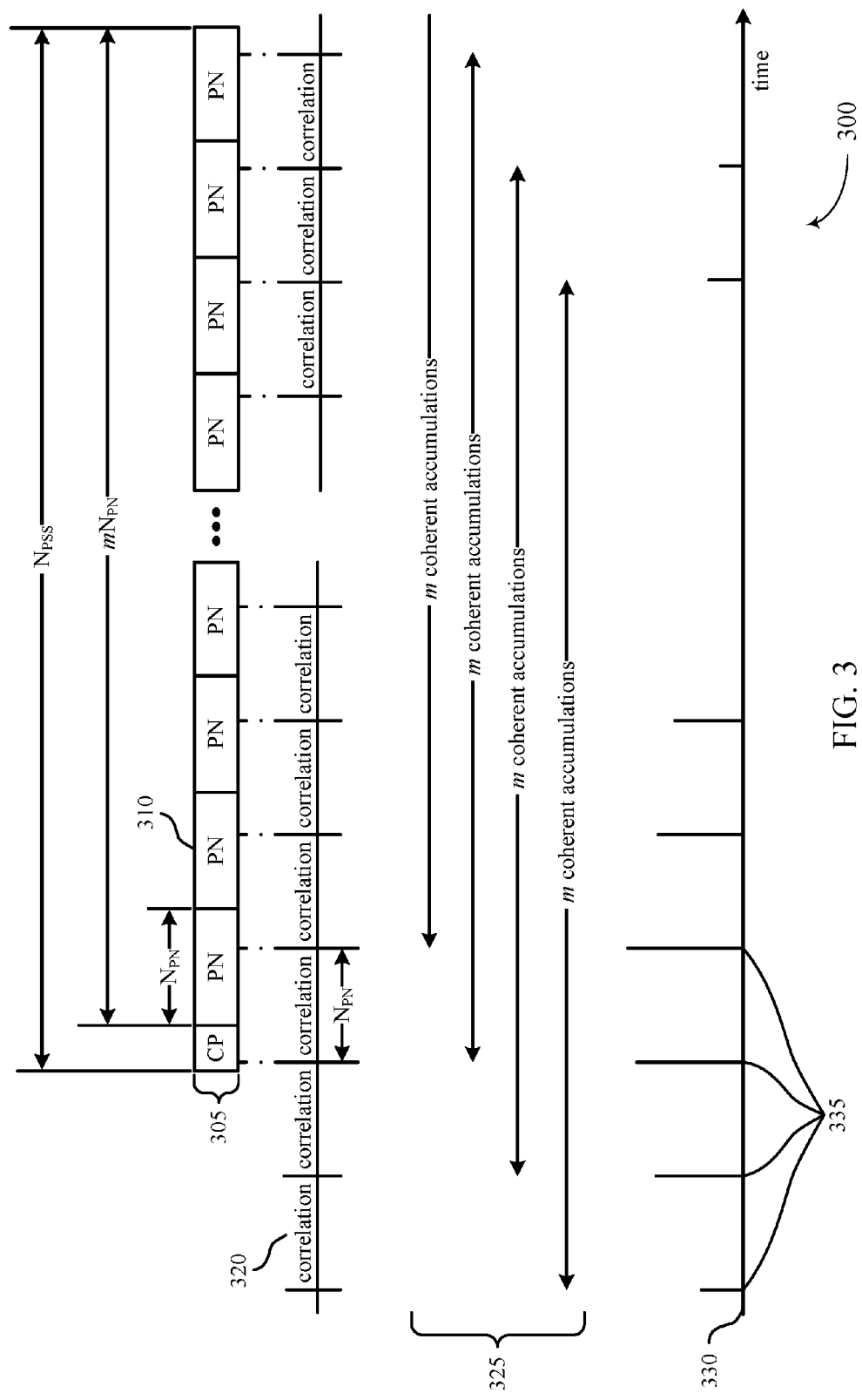
FIG. 3 illustrates an example of correlation intervals that support system scanning and acquisition in accordance with various aspects of the present disclosure.

FIG. 3 illustrates an example of correlation intervals 300 that support system scanning and acquisition in accordance with various aspects of the present disclosure. Synchronization signals and correlation intervals 300 may be utilized by a UEs 115 and base stations 105 as described with reference to FIGS. 1-2. Correlation intervals 300 may be used as part of a first stage of a two stage system synchronization process.

Correlation intervals 300 may cover a time period for reception of a synchronization signal 305, which may include a number of repetitions of PN sequences 310. Synchronization signal 305 may have length $N_{PSS}$, PN sequence 310 may have length $N_{PN}$, and the PN sequences 310 may have length $mN_{PN}$ (where m is the number repetitions).

Correlation intervals 300 may include of a number of non-overlapping coherent correlation intervals 320. The overlapping accumulation intervals 325 may each include m coherent correlations associated with sequence repetitions. Local timing 330 may determine the boundaries of the overlapping accumulation intervals 325, and the correlations performed during accumulation intervals 325 may be combined with an offset based on the correlations and used to define candidates for the system timing.

Figure 4A:
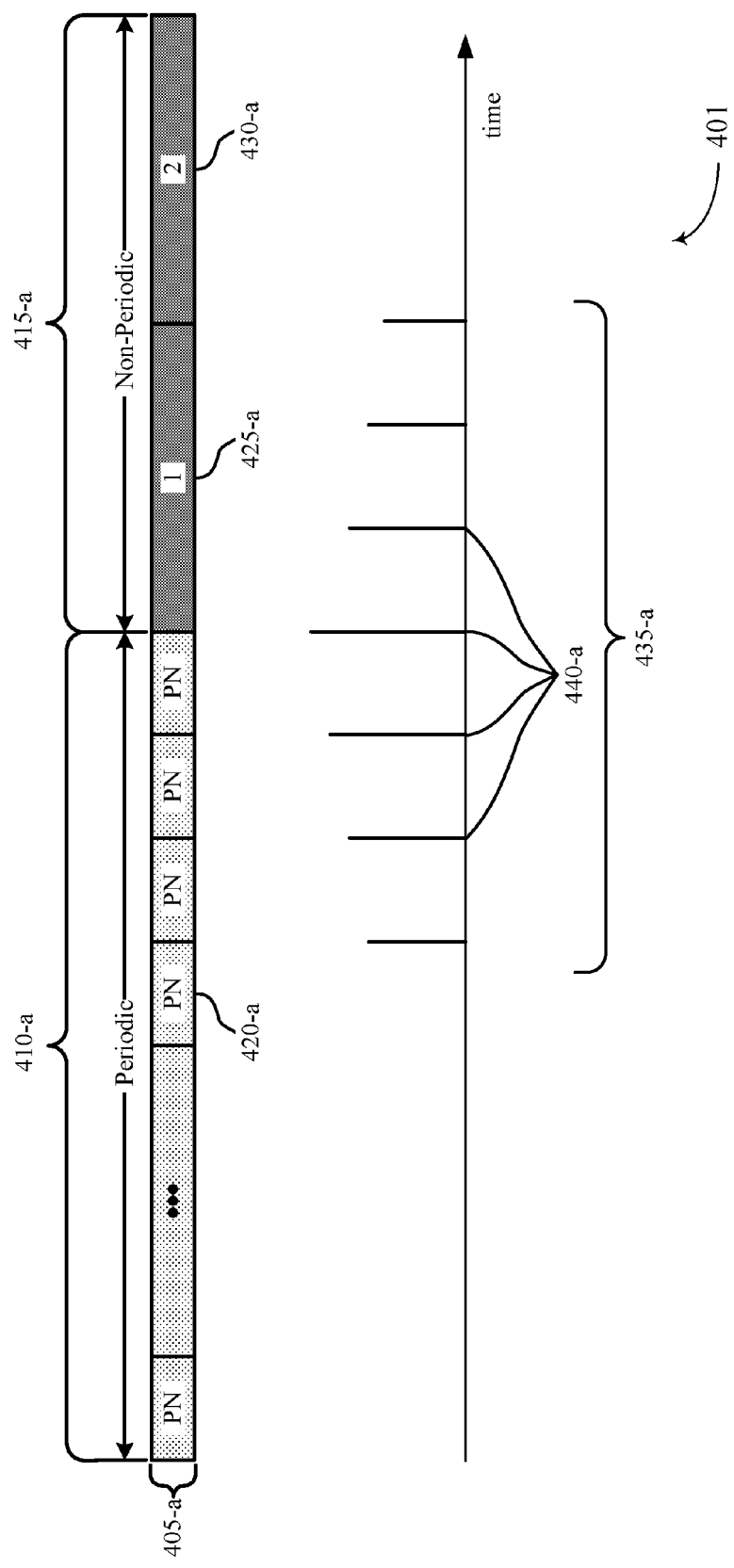
FIGS. 4A and 4B illustrate examples of synchronization signal formats that support system scanning and acquisition in accordance with various aspects of the present disclosure.
Figure 4B:
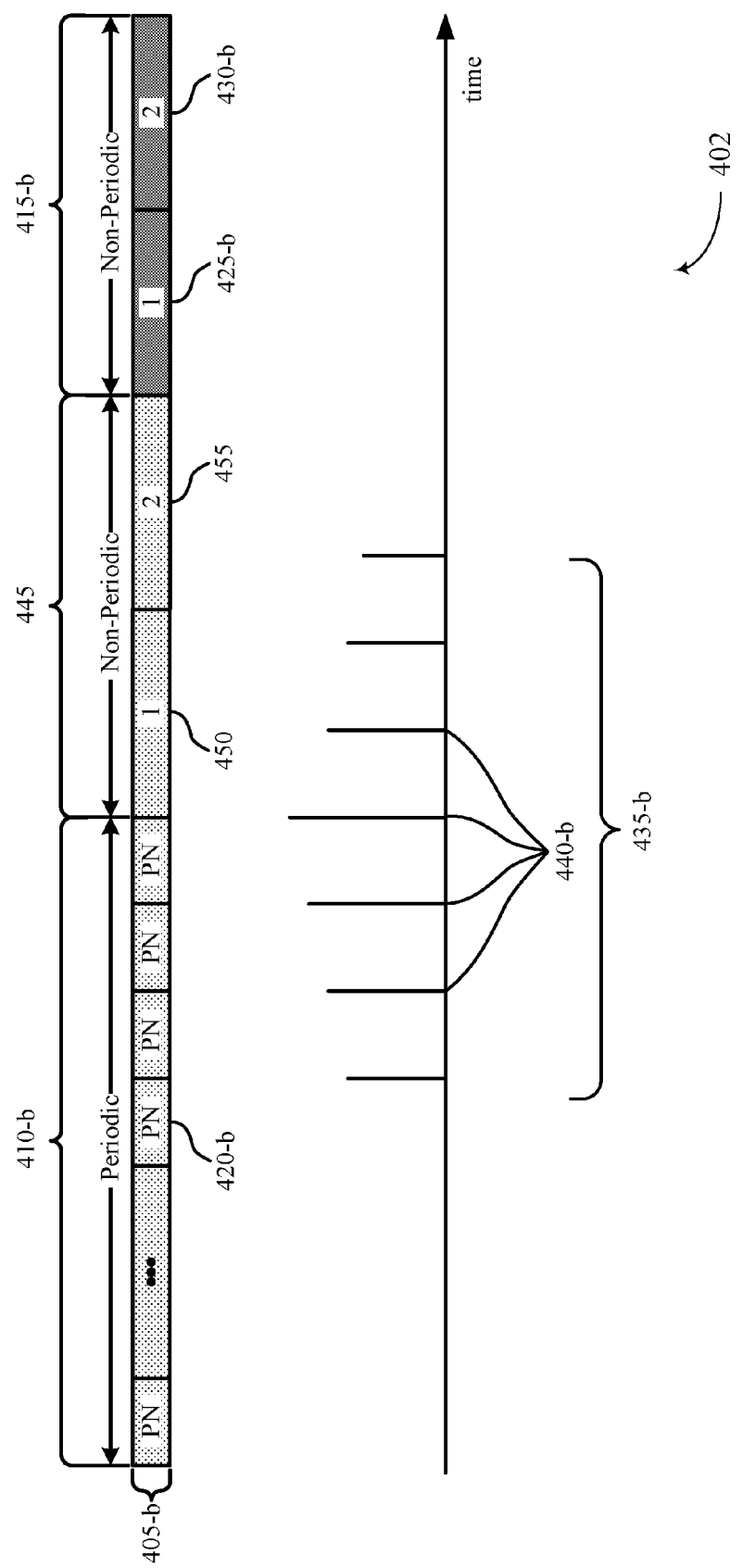

FIGS. 4A and 4B illustrate examples of synchronization signal formats 401 and 402 that support system scanning and acquisition in accordance with various aspects of the present disclosure. Synchronization signal formats 401 and 402 may be utilized by a UEs 115 and base stations 105 as part of a second stage of a two stage synchronization process.

As illustrated in FIG. 4A, network timing signal 405-*a* may include a number of sequence repetitions 410-*a*, which may correspond to a first synchronization signal (e.g., a PSS). Sequence repetitions 410-*a* may be periodic and may include a number of PN sequences 420-*a*. Network timing signal 405-*a* may also include a cyclic prefix, and non-periodic signal 415-*a*, which may correspond to a second synchronization signal (e.g., an SSS). Non-periodic signal 415-*a* may include a first symbol 425-*a* and a second symbol 430-*a*. Detector output 435-*a* may be the result of a first correlation stage as illustrated in FIG. 3. It may include multiple timing structure boundary candidates 440-*a*. A UE 115 may select the timing structure boundary from the set of candidates 440-*a* based on the non-periodic signal 415-*a*. That is, the UE 115 may perform a correlation between the signal received during an interval beginning at each of the set of candidates 440-*a* and the non-periodic signal 415-*a*, and select a system timing based on this set of correlations.

As illustrated in FIG. 4B, network timing signal 405-*b* may include a number of sequence repetitions 410-*b*, which may correspond to a portion of a first synchronization signal such as a PSS (e.g., the PSS-C as described with reference to FIG. 2). Sequence repetitions 410-*b* may be periodic and may include a number of repeated PN sequences 420-*b*. The network timing signal 405-*b* may include a non-periodic signal 445, which may correspond to a second portion of the first synchronization signal (e.g., the PSS-R as described with reference to FIG. 2). Non-periodic signal 445 may include a first symbol 450 and a second symbol 455. Network timing signal 405-*b* may also include a non-periodic signal 415-*b*, which may correspond to a second synchronization signal (e.g., an SSS) and may include a first symbol 425-*b* and a second symbol 430-*b*. Detector output 435-*b* may be the result of a first correlation stage as illustrated in FIG. 3. It may include multiple timing structure boundary candidates 440-*b*. A UE 115 may select the timing structure boundary from the set of candidates 440-*a* based on the non-periodic signal 445.

Figure 5:
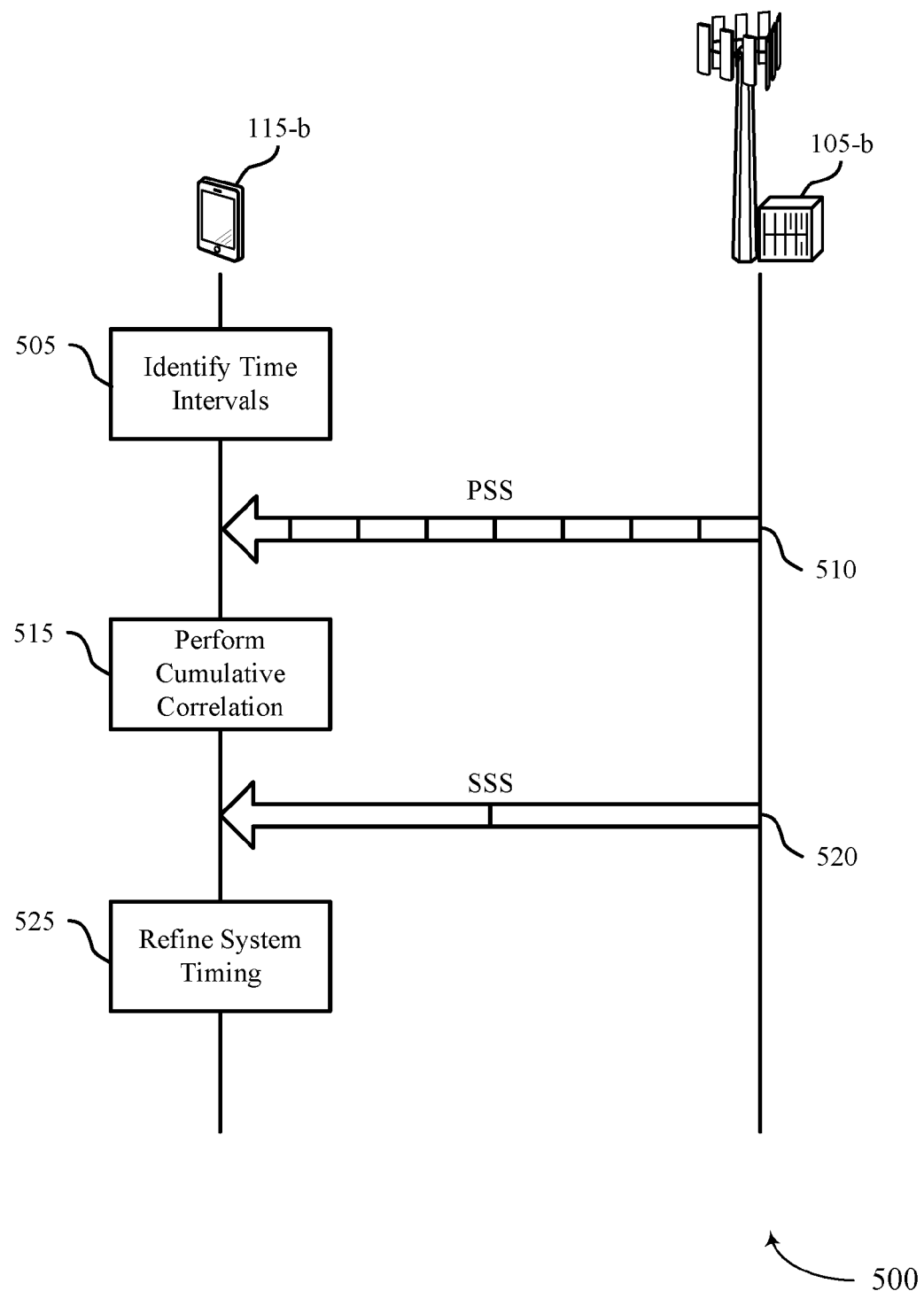
FIG. 5 illustrates an example of a process flow for a system that supports system scanning and acquisition in accordance with various aspects of the present disclosure.

FIG. 5 illustrates an example of a process flow 500 for a system that supports system scanning and acquisition in accordance with various aspects of the present disclosure. Process flow 500 may include a UE 115-*b* and base station 105-*b*, which may be examples of a UE 115 and base station 105 described with reference to FIGS. 1-2.

At step 505, UE 115-*b* may identify timing intervals associated with synchronization. The timing intervals may be determined by a local clock of UE 115-*b*. The beginning of each interval may be arbitrary, but the length of each interval may correspond to the length of the repeated sequences within the PSS.

At step 510, a first synchronization signal may be sent from base station 105-*b* to UE 115-*b*, where the synchronization signal may include multiple sequence repetitions. In the example of FIG. 5, each sequence repetition may be the same PN sequence. In some cases, the first synchronization signal may be a periodic signal, such as a PSS.

At step 515, UE 115-*b* may identify a set of candidates for a timing structure boundary based on the plurality of sequence repetitions. That is, UE 115-*b* may identify multiple overlapping accumulation intervals and may perform a cumulative correlation on the first synchronization signal for each of the overlapping accumulation intervals, such that the set of candidates is based on the cumulative correlation. Each of the cumulative correlations may include multiple coherent correlations associated with the plurality of sequence repetitions. The plurality of coherent correlations may correspond to a set of consecutive non-overlapping correlation intervals. In some cases, the set of candidates may be determined based on a magnitude for each of the cumulative correlations. In some instances, UE 115-*b* may determine a phase offset based on the cumulative correlations and may identify a set of candidates by shifting a boundary of each overlapping accumulation interval by the phase offset.

At step 520, a second synchronization signal may be sent from base station 105-*b* to UE 115-*b*, where the synchronization signal may be a non-periodic signal. In the example of FIG. 5, the second synchronization signal may be an SSS or a portion of the PSS.

At step 525, UE 115-*b* may determine a timing structure boundary from a set of candidates based on the second synchronization signal. That is, UE 115-*b* may perform a secondary correlation for the second synchronization signal for each of the timing structure boundary candidates, and the timing structure boundary may be determined based on the secondary correlations.

In some examples, UE 115-*b* may identify a cell group based on the first synchronization signal and may identify an ID based on the cell group and the second synchronization signal. In some cases, the first synchronization signal may be a periodic waveform selected from a set of periodic waveforms, and the cell group may be identified based on the periodic waveform. In some examples, the second synchronization signal may be a non-periodic waveform selected from a set of non-periodic waveforms and the cell ID may be based on the non-periodic waveform. In some cases, UE 115-*b* may identify a cell ID based on the second synchronization signal where the first synchronization signal may be based on a single frequency network. In some examples, the second synchronization signal may be a non-periodic waveform corresponding to a cell ID and may be selected from a set of non-periodic waveforms. In some cases, UE 115-*b* may receive a third synchronization signal (e.g., if the second synchronization signal is a second portion of a PSS, the third signal may be an SSS) and may determine a cell ID based on the third synchronization signal. In some cases, the first synchronization signal may be a single frequency network signal, the second synchronization signal may be a non-periodic waveform corresponding to a cell group and may be selected from a first set of non-periodic waveforms, and the third synchronization signal may be a non-periodic waveform corresponding to a cell ID and may be selected from a second set of non-periodic waveforms.

Figure 6:
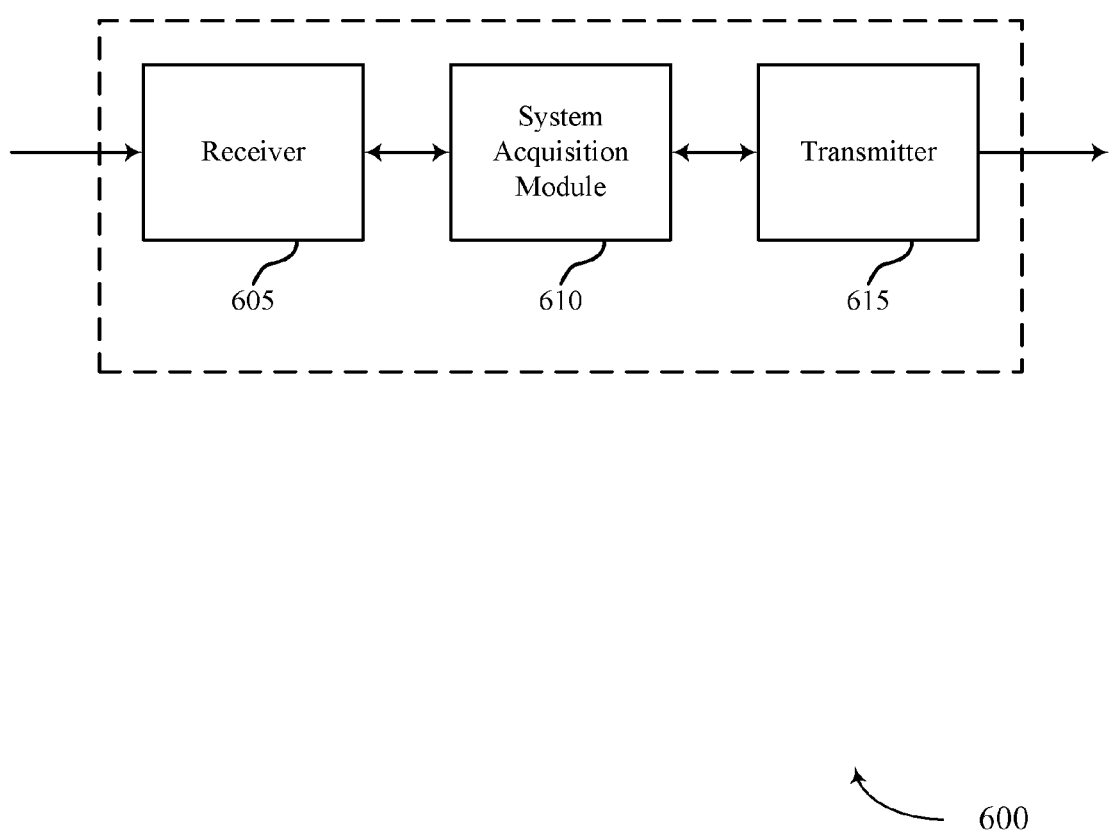
FIGS. 6-8 show block diagrams of a wireless device or devices that support system scanning and acquisition in accordance with various aspects of the present disclosure.

FIG. 6 shows a block diagram of a wireless device 600 that supports system scanning and acquisition in accordance with various aspects of the present disclosure. Wireless device 600 may be an example of aspects of a UE 115 described with reference to FIGS. 1-5. Wireless device 600 may include a receiver 605, a system acquisition module 610, or a transmitter 615. Wireless device 600 may also include a processor. Each of these components may be in communication with one another.

The receiver 605 may receive information such as packets, user data, or control information associated with various information channels (e.g., control channels, data channels, and information related to system scanning and acquisition, etc.). Information may be passed on to the system acquisition module 610, and to other components of wireless device 600.

The system acquisition module 610 may receive a first synchronization signal including multiple sequence repetitions, identify a set of candidates for a timing structure boundary based on the multiple sequence repetitions, and determine the timing structure boundary from the set of candidates based on a second synchronization signal.

The transmitter 615 may transmit signals received from other components of wireless device 600. In some examples, the transmitter 615 may be collocated with the receiver 605 in a transceiver module. The transmitter 615 may include a single antenna, or it may include multiple antennas.

Figure 7:
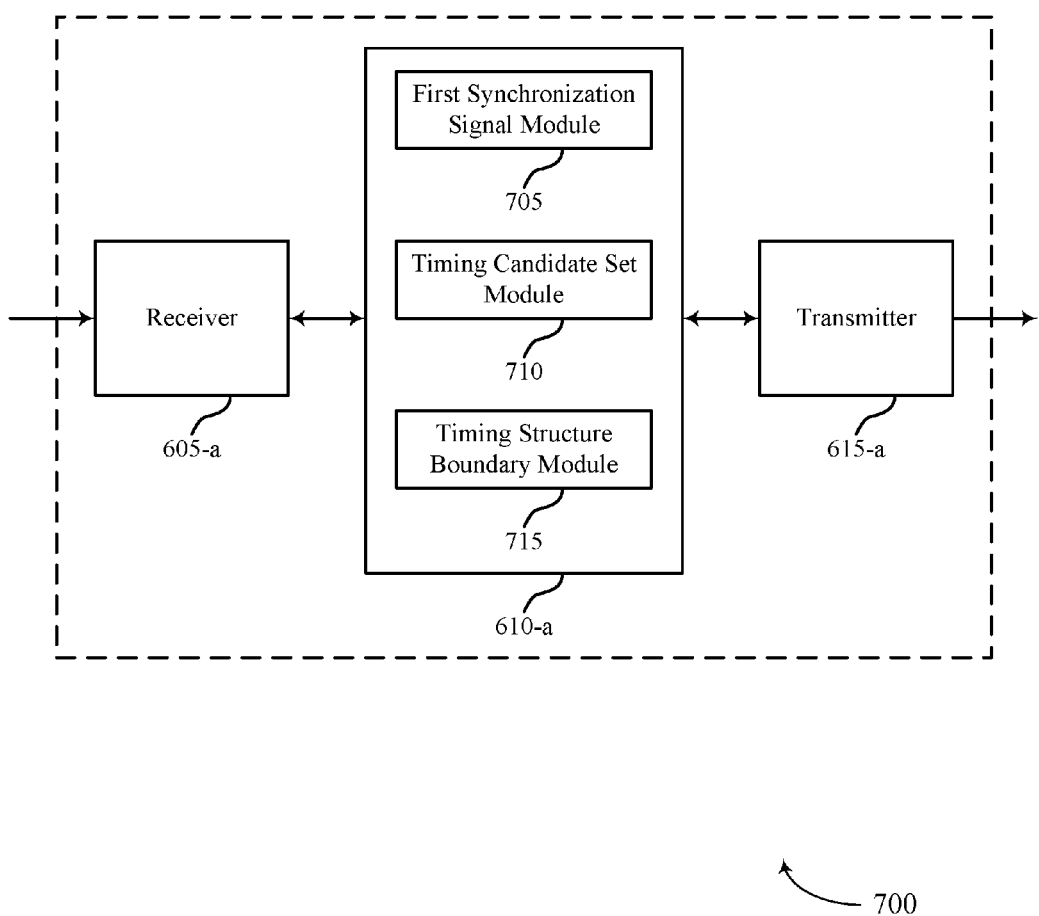

FIG. 7 shows a block diagram of a wireless device 700 that supports system scanning and acquisition in accordance with various aspects of the present disclosure. Wireless device 700 may be an example of aspects of a wireless device 600 or a UE 115 described with reference to FIGS. 1-6. Wireless device 700 may include a receiver 605-a, a system acquisition module 610-a, or a transmitter 615-a. Wireless device 700 may also include a processor. Each of these components may be in communication with one another. The system acquisition module 610-a may also include a first synchronization signal module 705, a timing candidate set module 710, and a timing structure boundary module 715.

The receiver 605-a may receive information which may be passed on to system acquisition module 610-a, and to other components of wireless device 700. The system acquisition module 610-a may perform the operations described with reference to FIG. 6. The transmitter 615-a may transmit signals received from other components of wireless device 700.

The first synchronization signal module 705 may receive a first synchronization signal including multiple sequence repetitions as described with reference to FIGS. 2-5. In some examples, each sequence repetition of the plurality of sequence repetitions includes a same PN sequence. In some examples, the first synchronization signal includes a periodic signal. In some examples, the first synchronization signal includes a PSS. In some examples, the first synchronization signal includes a single frequency network signal. In some examples, the periodic waveform of the first synchronization signal includes a single frequency network signal.

The timing candidate set module 710 may identify a set of candidates for a timing structure boundary based on the plurality of sequence repetitions as described with reference to FIGS. 2-5. The timing structure boundary module 715 may determine the timing structure boundary from the set of candidates based on a second synchronization signal as described with reference to FIGS. 2-5.

Figure 8:
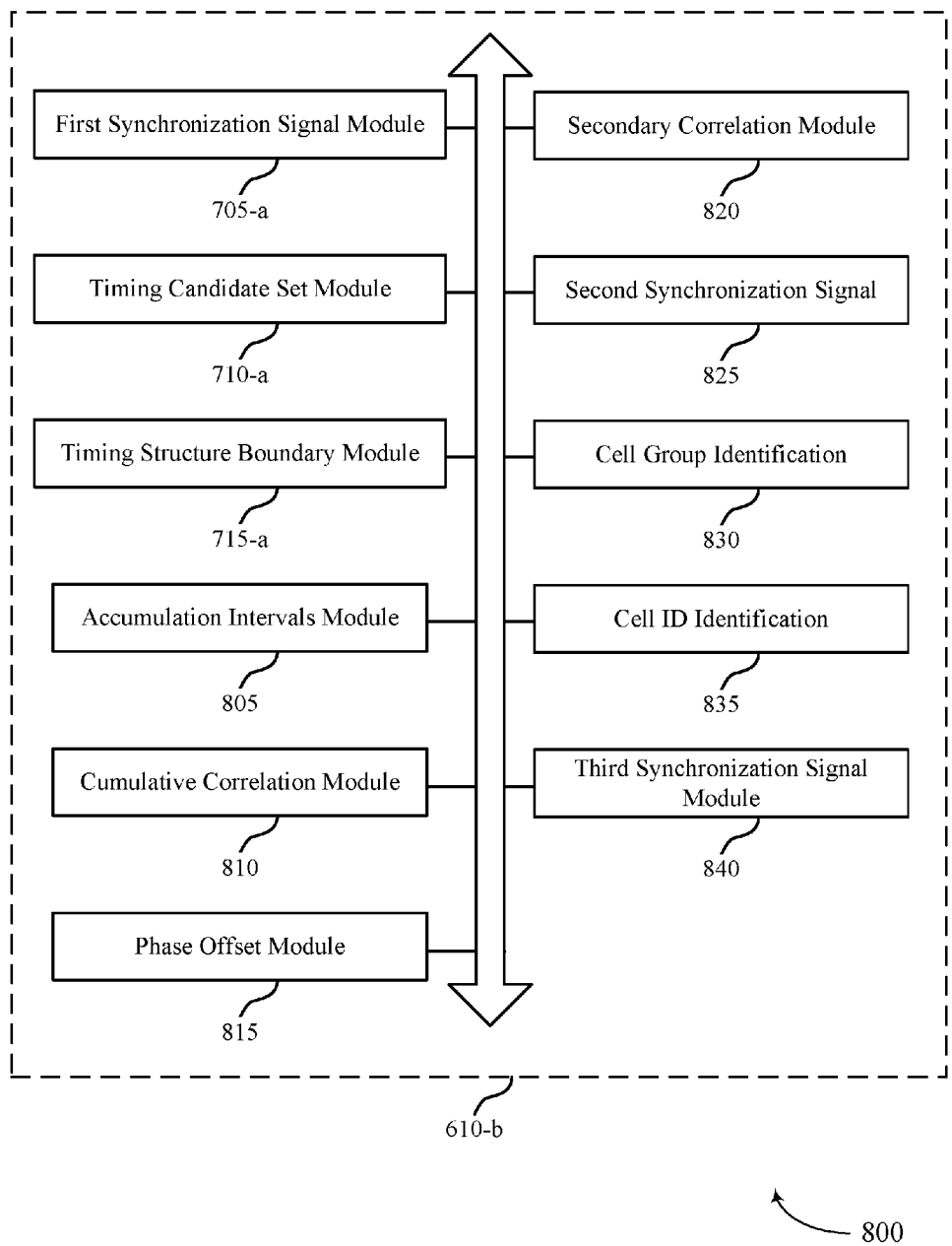

FIG. 8 shows a block diagram 800 of a system acquisition module 610-b which may be a component of a wireless device 600 or a wireless device 700 that supports system scanning and acquisition in accordance with various aspects of the present disclosure. The system acquisition module 610-b may be an example of aspects of a system acquisition module 610 described with reference to FIGS. 6-7. The system acquisition module 610-b may include a first synchronization signal module 705-a, a timing candidate set module 710-a, and a timing structure boundary module 715-a. Each of these modules may perform the functions described with reference to FIG. 7. The system acquisition module 610-b may also include an accumulation intervals module 805, a cumulative correlation module 810, a phase offset module 815, a secondary correlation module 820, a second synchronization signal 825, a cell group identification 830, a cell ID identification 835, and a third synchronization signal module 840.

The accumulation intervals module 805 may identify multiple overlapping accumulation intervals as described with reference to FIGS. 2-5. In some examples, identifying the set of candidates includes shifting a boundary of each overlapping accumulation interval by the phase offset.

The cumulative correlation module 810 may perform a cumulative correlation for the first synchronization signal for each of the overlapping accumulation intervals, such that the set of candidates is based on the cumulative correlations as described with reference to FIGS. 2-5. In some examples, each of the cumulative correlations includes multiple coherent correlations associated with the plurality of sequence repetitions. In some examples, the plurality of coherent correlations corresponds to a set of consecutive non-overlapping correlation intervals. In some examples, the set of candidates are determined based on a magnitude for each of the cumulative correlations.

The phase offset module 815 may determine a phase offset based on the cumulative correlations as described with reference to FIGS. 2-5. The secondary correlation module 820 may perform a secondary correlation for the second synchronization signal for each of the timing structure boundary candidates, such that the timing structure boundary is determined based on the secondary correlations as described with reference to FIGS. 2-5.

The second synchronization signal 825 may be configured such that the second synchronization signal may include a non-periodic signal as described with reference to FIGS. 2-5. In some examples, the second synchronization signal includes at least a portion of an SSS. In some examples, the second synchronization signal includes a portion of a PSS. In some examples, the second synchronization signal includes a non-periodic waveform corresponding to a cell group and is selected from a first set of non-periodic waveforms.

The cell group identification 830 may identify a cell group based on the first synchronization signal as described with reference to FIGS. 2-5. In some examples, the first synchronization signal includes a periodic waveform selected from a set of periodic waveforms, and such that the cell group may be identified based on the periodic waveform. In some examples, the non-periodic waveform of the second synchronization signal corresponds to cell group and may be selected from a first set of non-periodic waveforms.

The cell ID identification 835 may identify a cell ID based on the cell group and the second synchronization signal as described with reference to FIGS. 2-5. In some examples, the second synchronization signal includes a non-periodic waveform selected from a set of non-periodic waveforms, and such that the cell ID may be based on the non-periodic waveform. The cell ID identification 835 may also identify a cell ID based on the second synchronization signal such that the first synchronization signal includes a single frequency network signal. In some examples, the second synchronization signal includes a non-periodic waveform corresponding to a cell ID and may be selected from a set of non-periodic waveforms. The cell ID identification 835 may also determine a cell ID based on the third synchronization signal. In some examples, the non-periodic waveform of the second synchronization signal corresponds to a cell ID and may be selected from a set of non-periodic waveforms. In some examples, the non-periodic waveform of the third synchronization signal corresponds to a cell ID and may be selected from a second set of non-periodic waveforms.

The third synchronization signal module 840 may receive a third synchronization signal as described with reference to FIGS. 2-5. In some examples, the third synchronization signal includes a non-periodic waveform corresponding to a cell ID and is selected from a second set of non-periodic waveforms.

Figure 9:
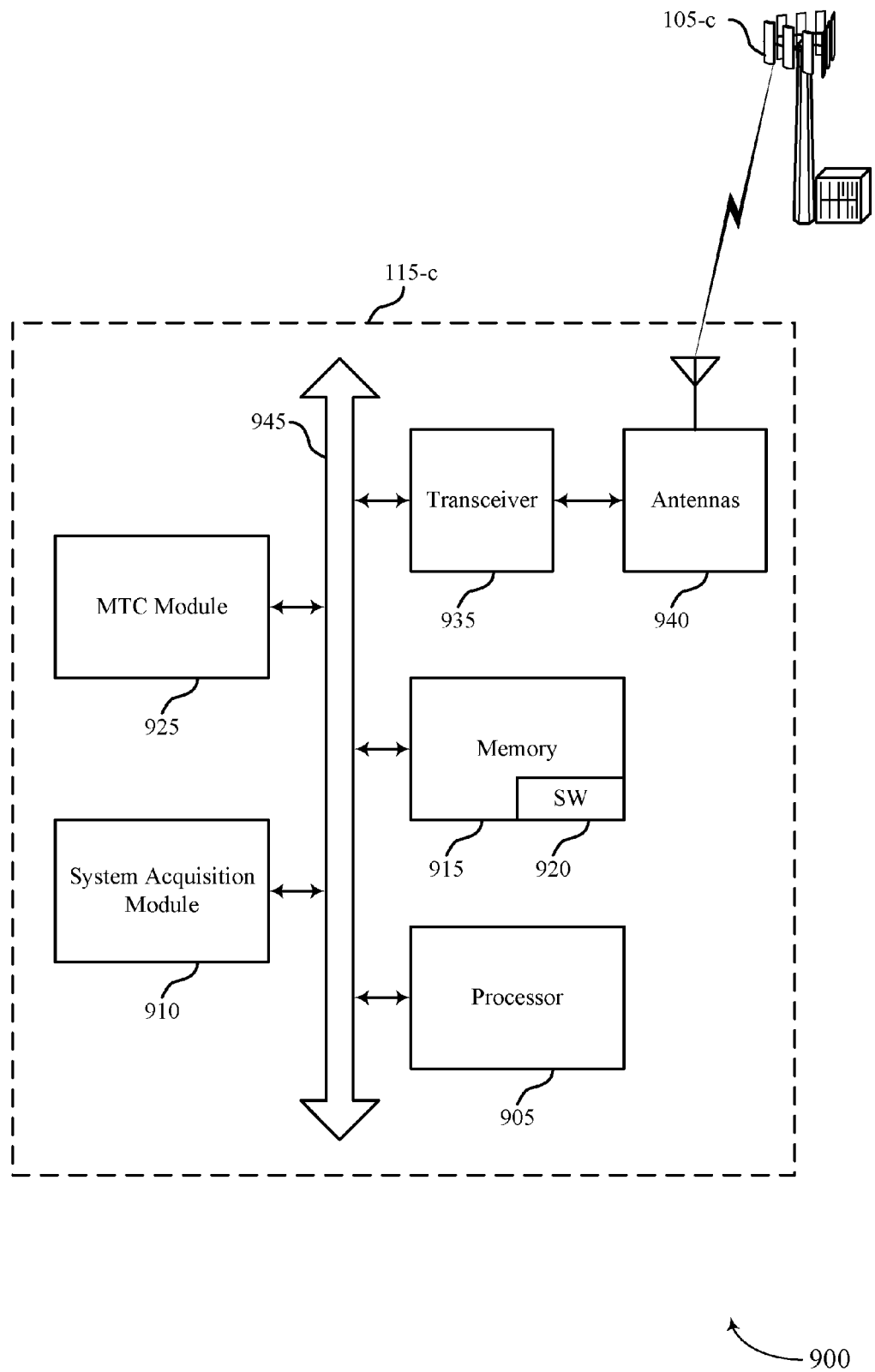
FIG. 9 illustrates a block diagram of a system, including a user equipment (UE), that supports system scanning and acquisition in accordance with various aspects of the present disclosure.

FIG. 9 shows a diagram of a system 900 including a UE 115 that supports system scanning and acquisition in accordance with various aspects of the present disclosure. System 900 may include UE 115-*c*, which may be an example of a wireless device 600, a wireless device 700, or a UE 115 described with reference to FIGS. 1, 2 and 6-8. UE 115-*c* may include a system acquisition module 910, which may be an example of a system acquisition module 610 described with reference to FIGS. 6-8. In some cases, UE 115-*c* also includes an MTC module 925, which may enable MTC operation (e.g., "deep sleep" modes, coverage enhancement operation, etc.) as described herein. UE 115-*c* may also include components for bi-directional voice and data communications including components for transmitting communications and components for receiving communications. For example, UE 115-*c* may communicate bi-directionally with base station 105-*c*.

UE 115-*c* may also include a processor 905, and memory 915 (including software (SW) 920), a transceiver 935, and one or more antenna(s) 940, each of which may communicate, directly or indirectly, with one another (e.g., via buses 945). The transceiver 935 may communicate bi-directionally, via the antenna(s) 940 or wired or wireless links, with one or more networks, as described above. For example, the transceiver 935 may communicate bi-directionally with a base station 105 or another UE 115. The transceiver 935 may include a modem to modulate the packets and provide the modulated packets to the antenna(s) 940 for transmission, and to demodulate packets received from the antenna(s) 940. While UE 115-*c* may include a single antenna 940, UE 115-*c* may also have multiple antennas 940 capable of concurrently transmitting or receiving multiple wireless transmissions.

The memory 915 may include random access memory (RAM) and read only memory (ROM). The memory 915 may store computer-readable, computer-executable software/firmware code 920 including instructions that, when executed, cause the processor 905 to perform various functions described herein (e.g., system scanning and acquisition, etc.). Alternatively, the software/firmware code 920 may not be directly executable by the processor 905 but cause a computer (e.g., when compiled and executed) to perform functions described herein. The processor 905 may include an intelligent hardware device, (e.g., a central processing unit (CPU), a microcontroller, an application specific integrated circuit (ASIC), etc.)

Figure 10:
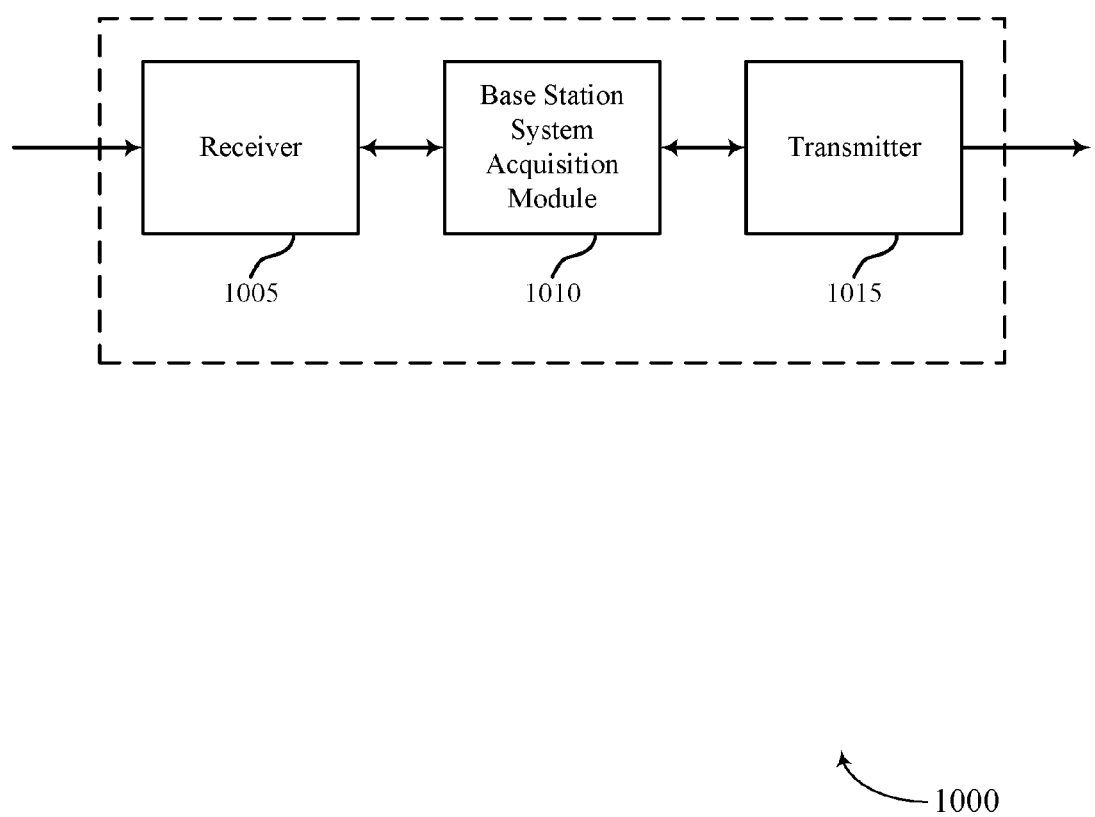
FIGS. 10-12 show block diagrams of a wireless device or devices that support system scanning and acquisition in accordance with various aspects of the present disclosure.

FIG. 10 shows a block diagram of a wireless device 1000 that supports system scanning and acquisition in accordance with various aspects of the present disclosure. Wireless device 1000 may be an example of aspects of a base station 105 described with reference to FIGS. 1-9. Wireless device 1000 may include a receiver 1005, a base station system acquisition module 1010, or a transmitter 1015. Wireless device 1000 may also include a processor. Each of these components may be in communication with one another.

The receiver 1005 may receive information such as packets, user data, or control information associated with various information channels (e.g., control channels, data channels, and information related to system scanning and acquisition, etc.). Information may be passed on to the base station system acquisition module 1010, and to other components of wireless device 1000.

The base station system acquisition module 1010 may transmit a first synchronization signal including multiple sequence repetitions, such that the first synchronization signal includes a periodic waveform, and transmit a second synchronization signal including a non-periodic waveform.

The transmitter 1015 may transmit signals received from other components of wireless device 1000. In some examples, the transmitter 1015 may be collocated with the receiver 1005 in a transceiver module. The transmitter 1015 may include a single antenna, or it may include multiple antennas.

Figure 11:
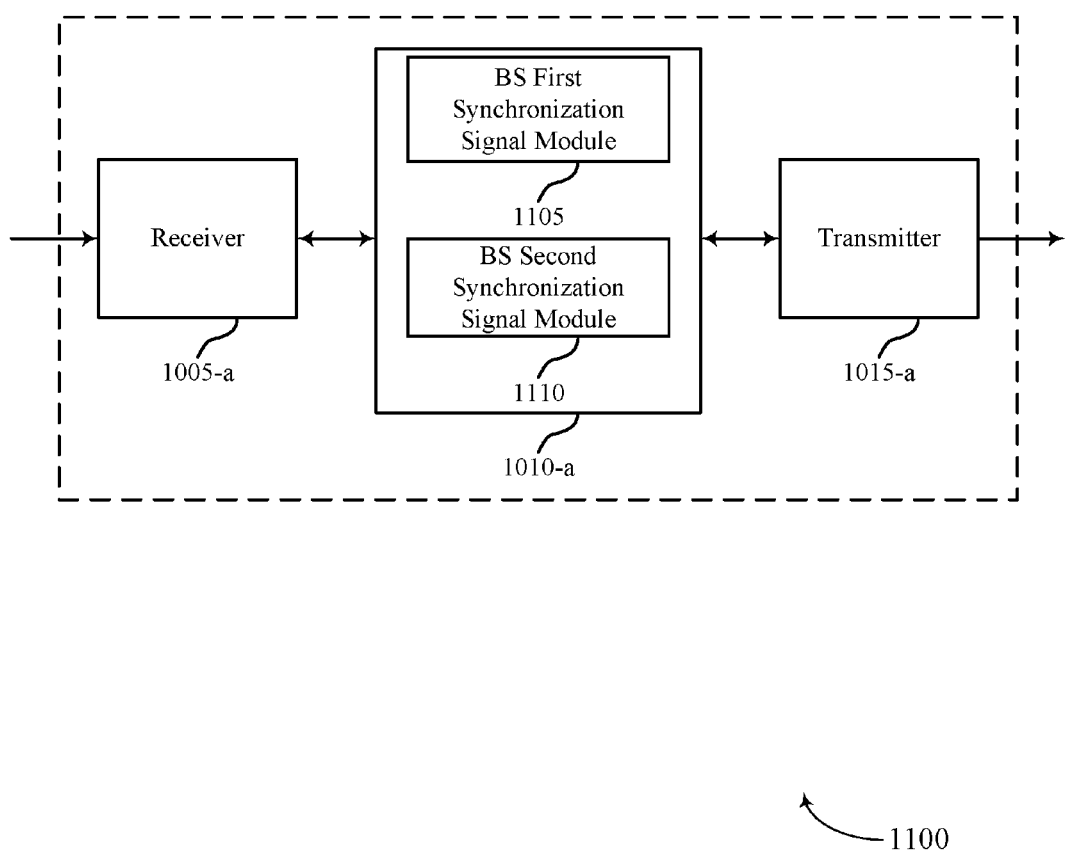

FIG. 11 shows a block diagram of a wireless device 1100 that supports system scanning and acquisition in accordance with various aspects of the present disclosure. Wireless device 1100 may be an example of aspects of a wireless device 1000 or a base station 105 described with reference to FIGS. 1-10. Wireless device 1100 may include a receiver 1005-*a*, a base station system acquisition module 1010-*a*, or a transmitter 1015-*a*. Wireless device 1100 may also include a processor. Each of these components may be in communication with each other. The base station system acquisition module 1010-*a* may also include a BS first synchronization signal module 1105, and a BS second synchronization signal module 1110.

The receiver 1005-*a* may receive information which may be passed on to base station system acquisition module 1010-*a*, and to other components of wireless device 1100. The base station system acquisition module 1010-*a* may perform the operations described with reference to FIG. 10. The transmitter 1015-*a* may transmit signals received from other components of wireless device 1100.

The BS first synchronization signal module 1105 may transmit a first synchronization signal including multiple sequence repetitions, such that the first synchronization signal includes a periodic waveform as described with reference to FIGS. 2-5. The BS second synchronization signal module 1110 may transmit a second synchronization signal including a non-periodic waveform as described with reference to FIGS. 2-5.

Figure 12:
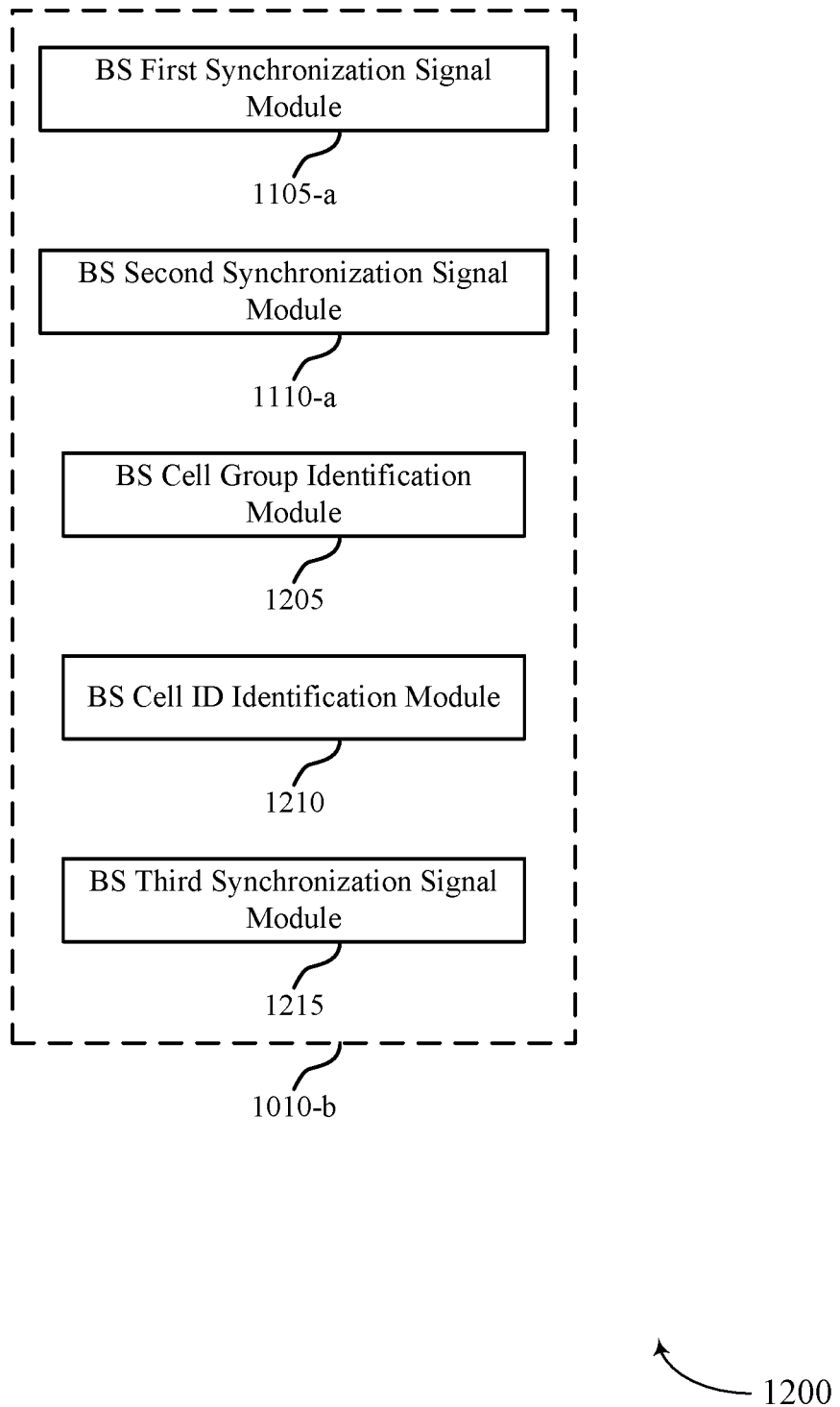

FIG. 12 shows a block diagram 1200 of a base station system acquisition module 1010-*b* which may be a component of a wireless device 1000 or a wireless device 1100 that supports system scanning and acquisition in accordance with various aspects of the present disclosure. The base station system acquisition module 1010-*b* may be an example of aspects of a base station system acquisition module 1010 described with reference to FIGS. 10-11. The base station system acquisition module 1010-*b* may include a BS first synchronization signal module 1105-*a*, and a BS second synchronization signal module 1110-*a*. Each of these modules may perform the functions described with reference to FIG. 11. The base station system acquisition module 1010-*b* may also include a BS cell group identification module 1205, a BS cell ID identification module 1210, and a BS third synchronization signal module 1215.

The BS cell group identification module 1205 may be configured such that the periodic waveform of the first synchronization signal corresponds to a cell group and may be selected from a set of periodic waveforms as described with reference to FIGS. 2-5. The BS cell ID identification module 1210 may be configured such that the non-periodic waveform of the second synchronization signal corresponds to a cell ID and may be selected from a set of non-periodic waveforms as described with reference to FIGS. 2-5. The BS third synchronization signal module 1215 may transmit a third synchronization signal including a non-periodic waveform as described with reference to FIGS. 2-5.

Figure 13:
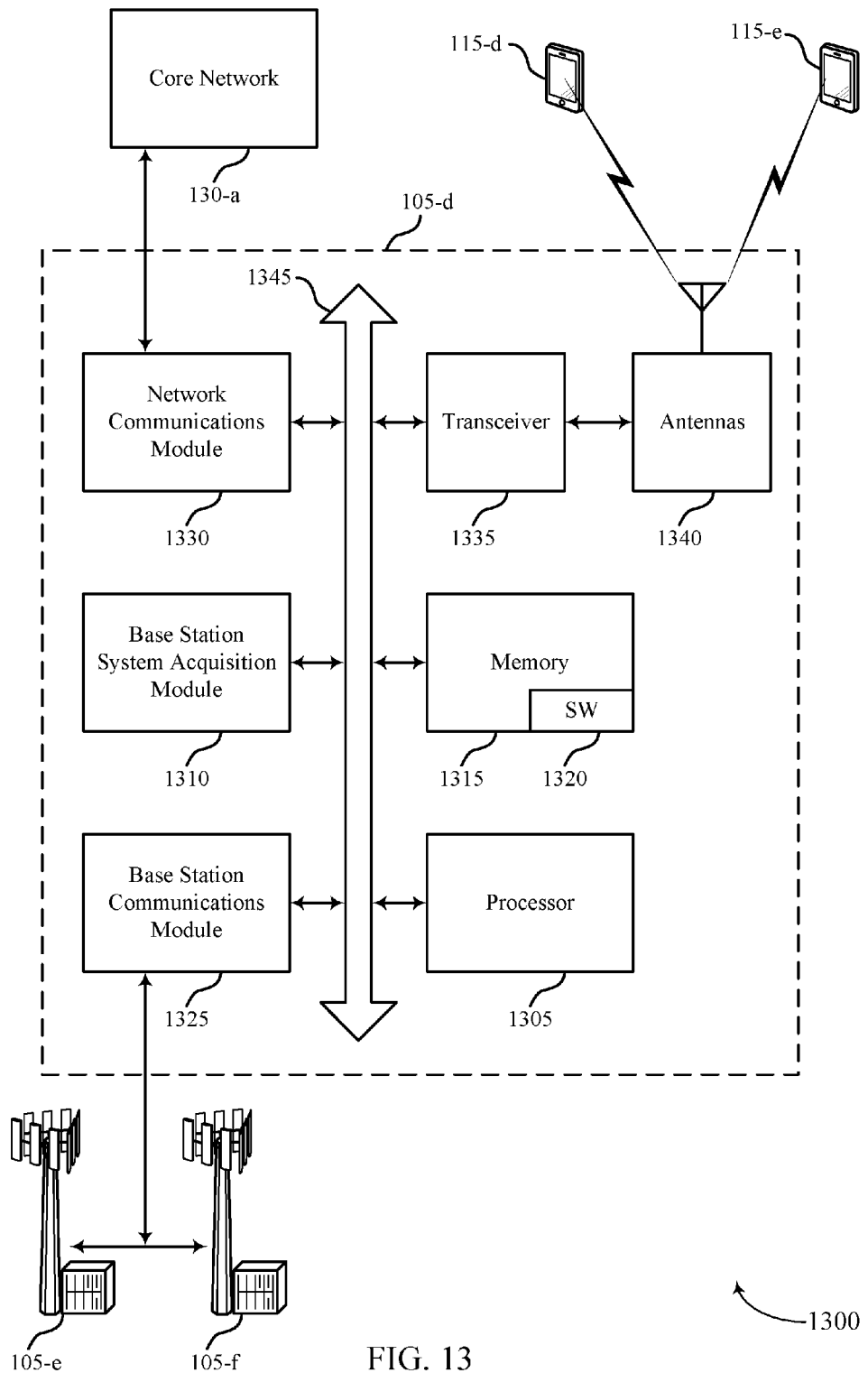
FIG. 13 illustrates a block diagram of a system, including a base station, that supports system scanning and acquisition in accordance with various aspects of the present disclosure.

FIG. 13 shows a diagram of a system 1300 including a base station 105 that supports system scanning and acquisition in accordance with various aspects of the present disclosure. System 1300 may include base station 105-d, which may be an example of a wireless device 1000, a wireless device 1100, or a base station 105 described with reference to FIGS. 1, 2 and 10-12. Base station 105-d may include a base station system acquisition module 1310, which may be an example of a base station system acquisition module 1010 described with reference to FIGS. 10-12. Base station 105-d may also include components for bi-directional voice and data communications including components for transmitting communications and components for receiving communications. For example, base station 105-d may communicate bi-directionally with UE 115-d or UE 115-e In some cases, base station 105-d may have one or more wired backhaul links. Base station 105-d may have a wired backhaul link (e.g., S1 interface, etc.) to the core network 130. Base station 105-d may also communicate with other base stations 105, such as base station 105-e and base station 105-f via inter-base station backhaul links (e.g., an X2 interface). Each of the base stations 105 may communicate with UEs 115 using the same or different wireless communications technologies. In some cases, base station 105-d may communicate with other base stations such as 105-e or 105-f utilizing base station communications module 1325. In some examples, base station communications module 1325 may provide an X2 interface within a LTE/LTE-A wireless communication network technology to provide communication between some of the base stations 105. In some examples, base station 105-d may communicate with other base stations through core network 130. In some cases, base station 105-d may communicate with the core network 130 through network communications module 1330.

The base station 105-d may include a processor 1305, memory 1315 (including software (SW) 1320), transceiver 1335, and antenna(s) 1340, which each may be in communication, directly or indirectly, with one another (e.g., over bus system 1345). The transceivers 1335 may be configured to communicate bi-directionally, via the antenna(s) 1340, with the UEs 115, which may be multi-mode devices. The transceiver 1335 (or other components of the base station 105-d) may also be configured to communicate bi-directionally, via the antennas 1340, with one or more other base stations (not shown). The transceiver 1335 may include a modem configured to modulate the packets and provide the modulated packets to the antennas 1340 for transmission, and to demodulate packets received from the antennas 1340. The base station 105-d may include multiple transceivers 1335, each with one or more associated antennas 1340. The transceiver may be an example of a combined receiver 1005 and transmitter 1015 of FIG. 10.

The memory 1315 may include RAM and ROM. The memory 1315 may also store computer-readable, computer-executable software code 1320 containing instructions that are configured to, when executed, cause the processor 1305 to perform various functions described herein (e.g., system scanning and acquisition, selecting coverage enhancement techniques, call processing, database management, message routing, etc.). Alternatively, the software 1320 may not be directly executable by the processor 1305 but be configured to cause the computer, e.g., when compiled and executed, to perform functions described herein. The processor 1305 may include an intelligent hardware device, e.g., a CPU, a microcontroller, an ASIC, etc. The processor 1305 may include various special purpose processors such as encoders, queue processing modules, base band processors, radio head controllers, digital signal processor (DSPs), and the like.

The base station communications module 1325 may manage communications with other base stations 105. In some cases, a communications management module may include a controller or scheduler for controlling communications with UEs 115 in cooperation with other base stations 105. For example, the base station communications module 1325 may coordinate scheduling for transmissions to UEs 115 for various interference mitigation techniques such as beamforming or joint transmission.

The components of wireless device 600, wireless device 700, system acquisition module 610, system 900, wireless device 1000, wireless device 1100, BS system acquisition module 1010, or system 1300 may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 14:
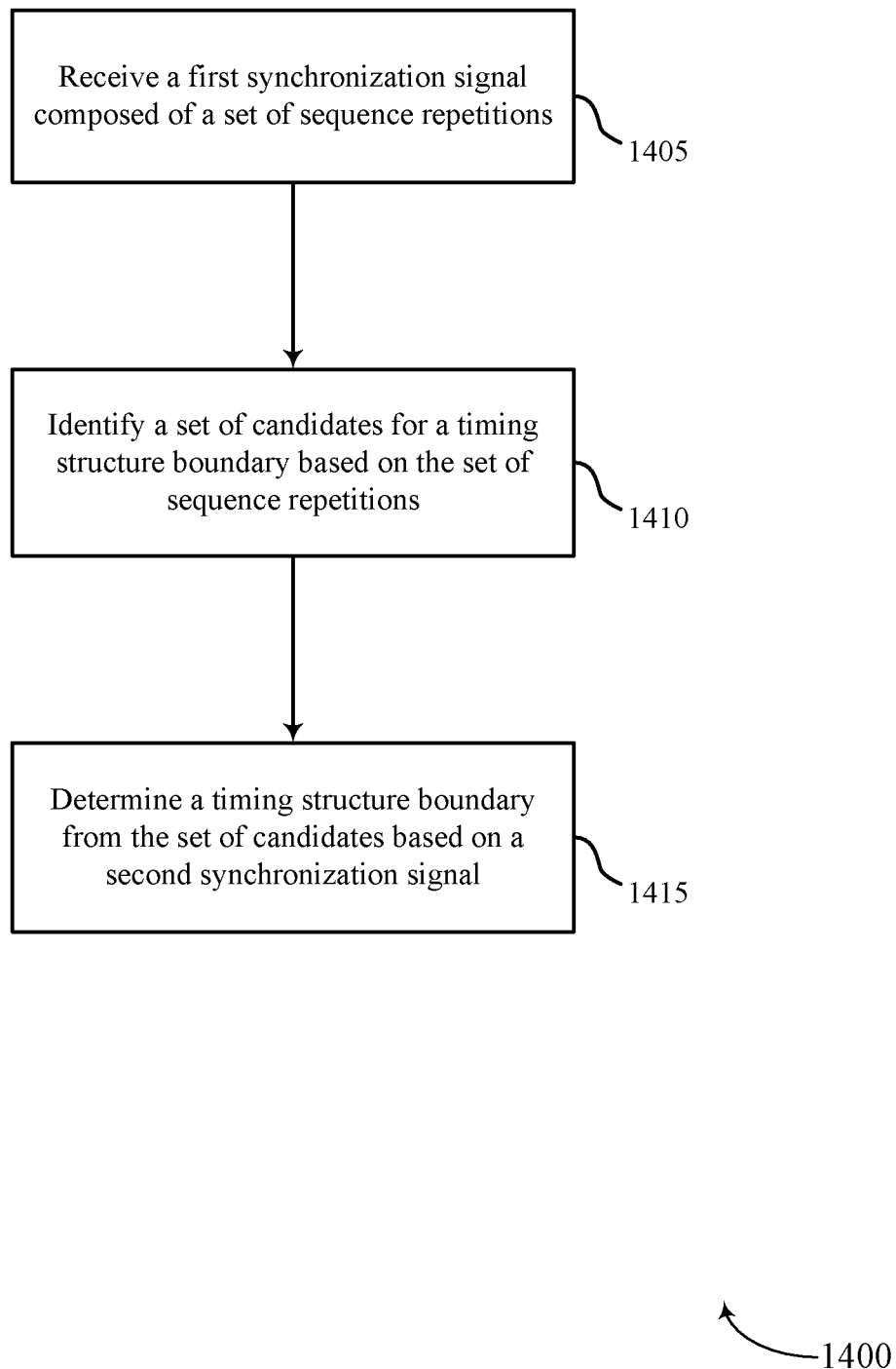
FIGS. 14-19 illustrate methods for system scanning and acquisition in accordance with various aspects of the present disclosure.

FIG. 14 shows a flowchart illustrating a method 1400 for system scanning and acquisition in accordance with various aspects of the present disclosure. The operations of method 1400 may be implemented by a UE 115 or its components as described with reference to FIGS. 1-13. For example, the operations of method 1400 may be performed by the system acquisition module 610 as described with reference to FIGS. 6-9. In some examples, a UE 115 may execute a set of codes to control the functional elements of the UE 115 to perform the functions described below. Additionally or alternatively, the UE 115 may perform aspects the functions described below using special-purpose hardware.

At block 1405, the UE 115 may receive a first synchronization signal that includes (e.g., is composed of) multiple sequence repetitions as described with reference to FIGS. 2-5. In certain examples, the operations of block 1405 may be performed by the first synchronization signal module 705 as described with reference to FIG. 7.

At block 1410, the UE 115 may identify a set of candidates for a timing structure boundary based on the plurality of sequence repetitions as described with reference to FIGS. 2-5. In certain examples, the operations of block 1410 may be performed by the timing candidate set module 710 as described with reference to FIG. 7.

At block 1415, the UE 115 may determine the timing structure boundary from the set of candidates based on a second synchronization signal as described with reference to FIGS. 2-5. In certain examples, the operations of block 1415 may be performed by the timing structure boundary module 715 as described with reference to FIG. 7.

Figure 15:
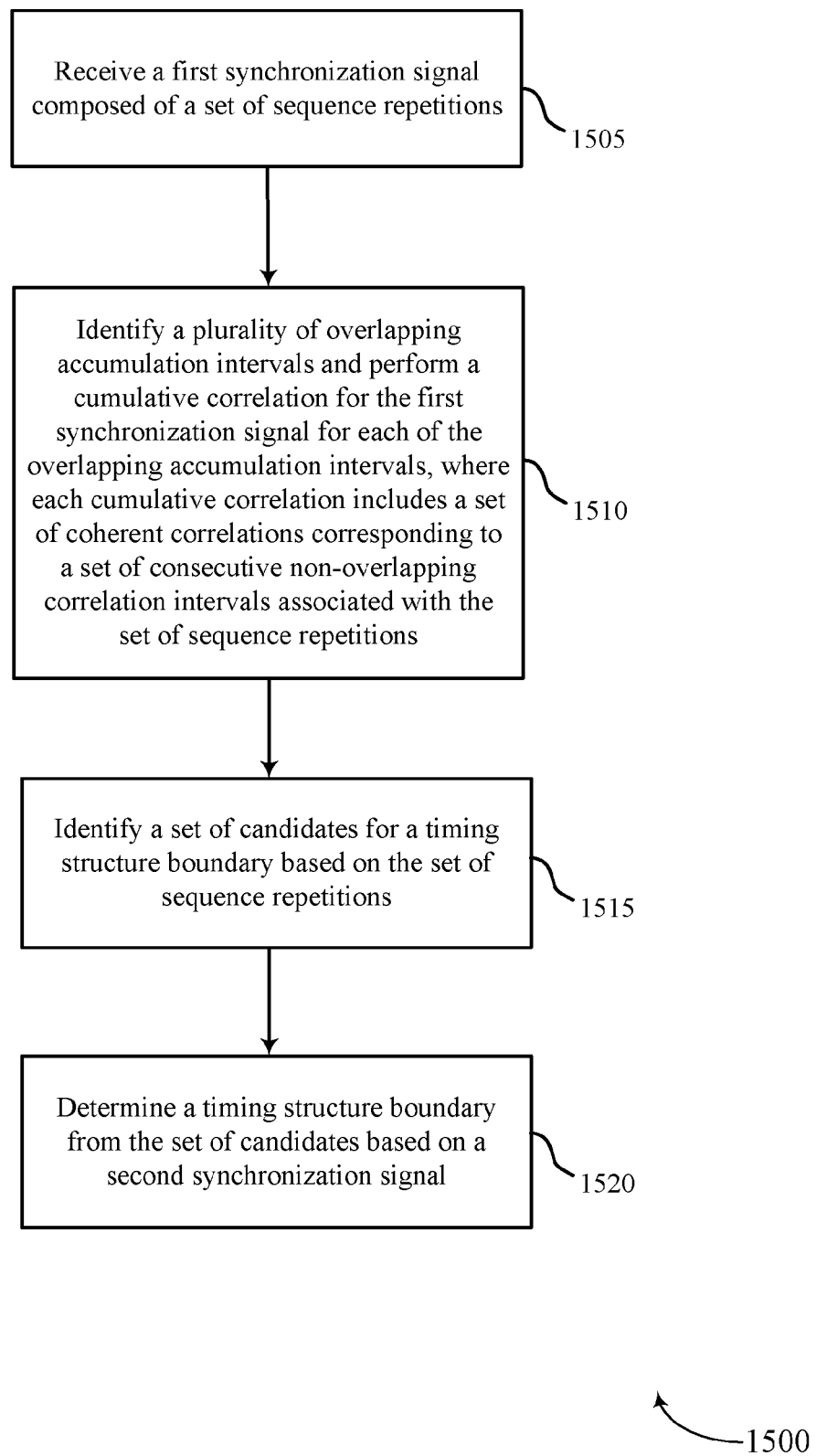

FIG. 15 shows a flowchart illustrating a method 1500 for system scanning and acquisition in accordance with various aspects of the present disclosure. The operations of method 1500 may be implemented by a UE 115 or its components as described with reference to FIGS. 1-13. For example, the operations of method 1500 may be performed by the system acquisition module 610 as described with reference to FIGS. 6-9. In some examples, a UE 115 may execute a set of codes to control the functional elements of the UE 115 to perform the functions described below. Additionally or alternatively, the UE 115 may perform aspects the functions described below using special-purpose hardware. The method 1500 may also incorporate aspects of method 1400 of FIG. 14.

At block 1505, the UE 115 may receive a first synchronization signal that includes multiple sequence repetitions as described with reference to FIGS. 2-5. In certain examples, the operations of block 1505 may be performed by the first synchronization signal module 705 as described with reference to FIG. 7.

At block 1510, the UE 115 may identify multiple overlapping accumulation intervals and perform a cumulative correlation for the first synchronization signal for each of the overlapping accumulation intervals, where each cumulative correlation includes a set of coherent correlations corresponding to a set of consecutive non-overlapping correlation intervals associated with the set of sequence repetitions as described with reference to FIGS. 2-5. In certain examples, the operations of block 1510 may be performed by the cumulative correlation module 810 as described with reference to FIG. 8.

At block 1515, the UE 115 may identify a set of candidates for a timing structure boundary based on the plurality of sequence repetitions as described with reference to FIGS. 2-5. In certain examples, the operations of block 1515 may be performed by the timing candidate set module 710 as described with reference to FIG. 7.

At block 1520, the UE 115 may determine the timing structure boundary from the set of candidates based on a second synchronization signal as described with reference to FIGS. 2-5. In certain examples, the operations of block 1520 may be performed by the timing structure boundary module 715 as described with reference to FIG. 7.

Figure 16:
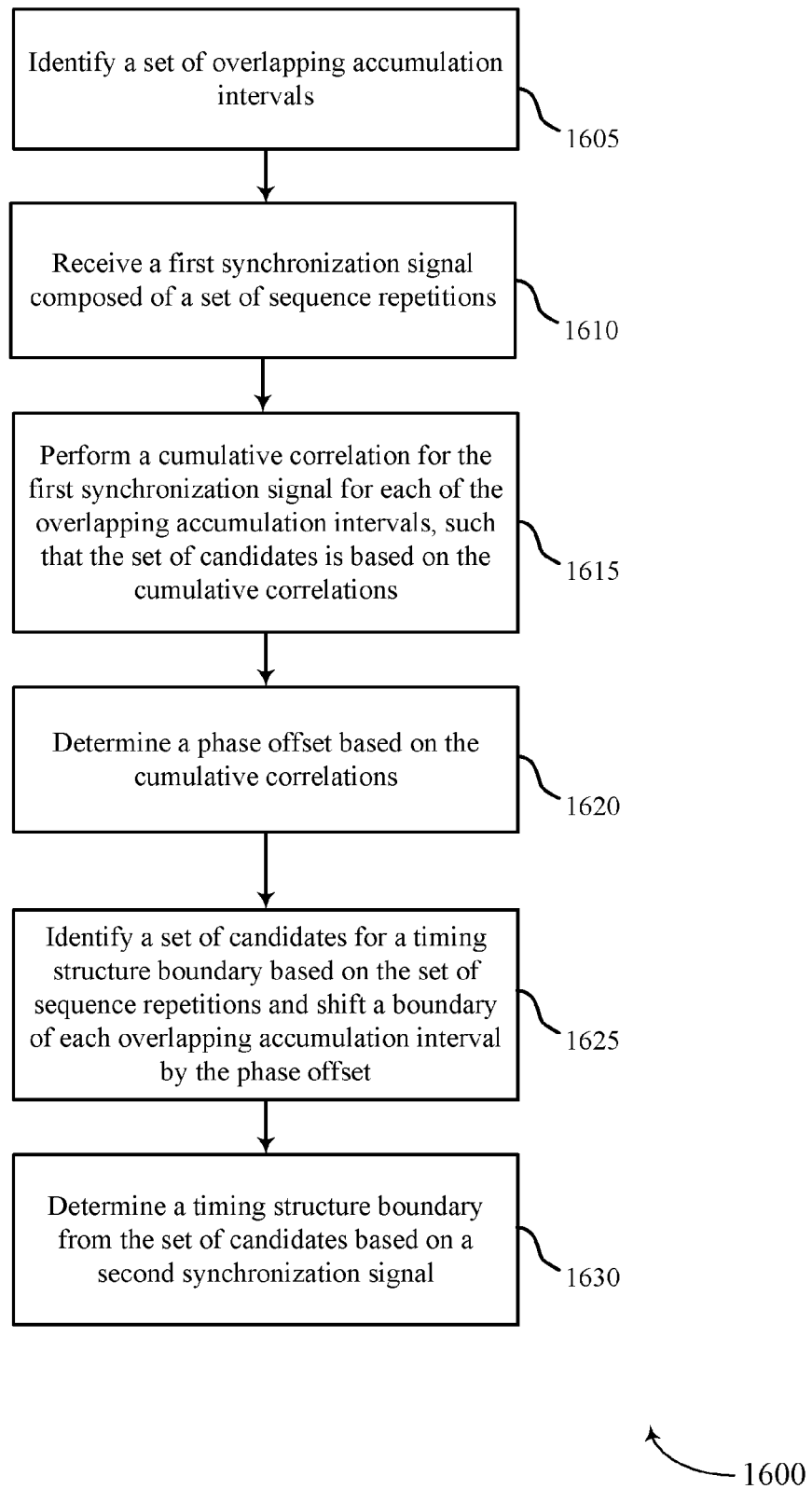

FIG. 16 shows a flowchart illustrating a method 1600 for system scanning and acquisition in accordance with various aspects of the present disclosure. The operations of method 1600 may be implemented by a UE 115 or its components as described with reference to FIGS. 1-13. For example, the operations of method 1600 may be performed by the system acquisition module 610 as described with reference to FIGS. 6-9. In some examples, a UE 115 may execute a set of codes to control the functional elements of the UE 115 to perform the functions described below. Additionally or alternatively, the UE 115 may perform aspects the functions described below using special-purpose hardware. The method 1600 may also incorporate aspects of methods 1400 or 1500 of FIGS. 14-15.

At block 1605, the UE 115 may identify multiple (or a set of) overlapping accumulation intervals as described with reference to FIGS. 2-5. In certain examples, the operations of block 1605 may be performed by the accumulation intervals module 805 as described with reference to FIG. 8.

At block 1610, the UE 115 may receive a first synchronization signal including multiple (or a set of) sequence repetitions as described with reference to FIGS. 2-5. In certain examples, the operations of block 1610 may be performed by the first synchronization signal module 705 as described with reference to FIG. 7.

At block 1615, the UE 115 may perform a cumulative correlation for the first synchronization signal for each of the overlapping accumulation intervals, such that a set of candidates is based on the cumulative correlations as described with reference to FIGS. 2-5. In certain examples, the operations of block 1615 may be performed by the cumulative correlation module 810 as described with reference to FIG. 8.

At block 1620, the UE 115 may determine a phase offset based on the cumulative correlations as described with reference to FIGS. 2-5. In certain examples, the operations of block 1620 may be performed by the phase offset module 815 as described with reference to FIG. 8.

At block 1625, the UE 115 may identify a set of candidates for a timing structure boundary based on the plurality of sequence repetitions as described with reference to FIGS. 2-5. In some cases, identifying the set of candidates may include shifting a boundary of each overlapping accumulation interval by the phase offset. In certain examples, the operations of block 1610 may be performed by the timing candidate set module 710 as described with reference to FIG. 7.

At block 1630, the UE 115 may determine the timing structure boundary from the set of candidates based on a second synchronization signal as described with reference to FIGS. 2-5. In certain examples, the operations of block 1615 may be performed by the timing structure boundary module 715 as described with reference to FIG. 7.

Figure 17:
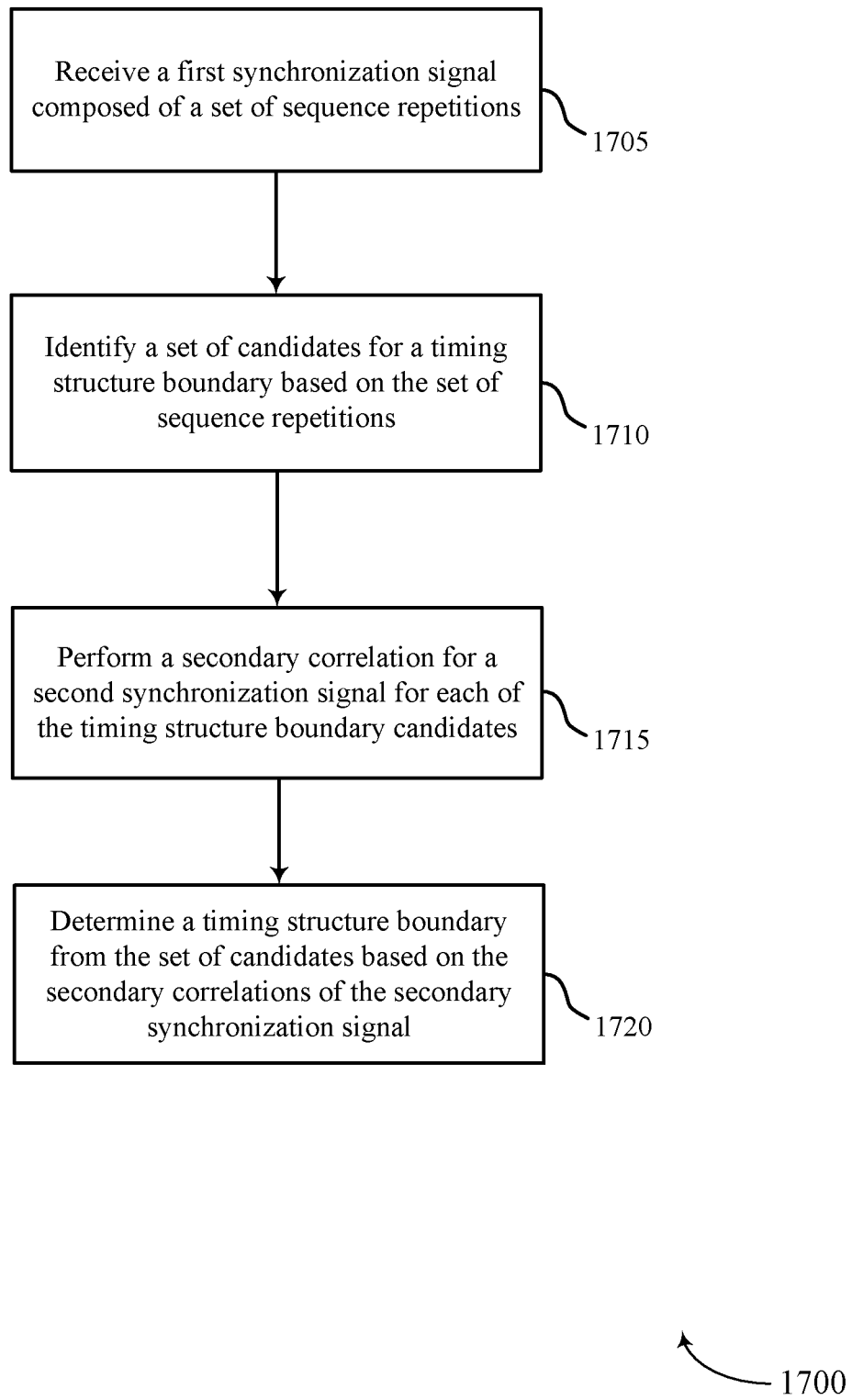

FIG. 17 shows a flowchart illustrating a method 1700 for system scanning and acquisition in accordance with various aspects of the present disclosure. The operations of method 1700 may be implemented by a UE 115 or its components as described with reference to FIGS. 1-13. For example, the operations of method 1700 may be performed by the system acquisition module 610 as described with reference to FIGS. 6-9. In some examples, a UE 115 may execute a set of codes to control the functional elements of the UE 115 to perform the functions described below. Additionally or alternatively, the UE 115 may perform aspects the functions described below using special-purpose hardware. The method 1700 may also incorporate aspects of methods 1400, 1500, or 1600 of FIGS. 14-16.

At block 1705, the UE 115 may receive a first synchronization signal that includes (or is composed of) multiple sequence repetitions as described with reference to FIGS. 2-5. In certain examples, the operations of block 1705 may be performed by the first synchronization signal module 705 as described with reference to FIG. 7.

At block 1710, the UE 115 may identify a set of candidates for a timing structure boundary based on the multiple (or set of) sequence repetitions as described with reference to FIGS. 2-5. In certain examples, the operations of block 1710 may be performed by the timing candidate set module 710 as described with reference to FIG. 7.

At block 1715, the UE 115 may perform a secondary correlation for the second synchronization signal for each of the timing structure boundary candidates as described with reference to FIGS. 2-5. In certain examples, the operations of block 1715 may be performed by the secondary correlation module 820 as described with reference to FIG. 8.

At block 1720, the UE 115 may determine the timing structure boundary from the set of candidates where the timing structure boundary may be determined based on the secondary correlations of the second synchronization signal as described with reference to FIGS. 2-5. In certain examples, the operations of block 1720 may be performed by the timing structure boundary module 715 as described with reference to FIG. 7.

Figure 18:
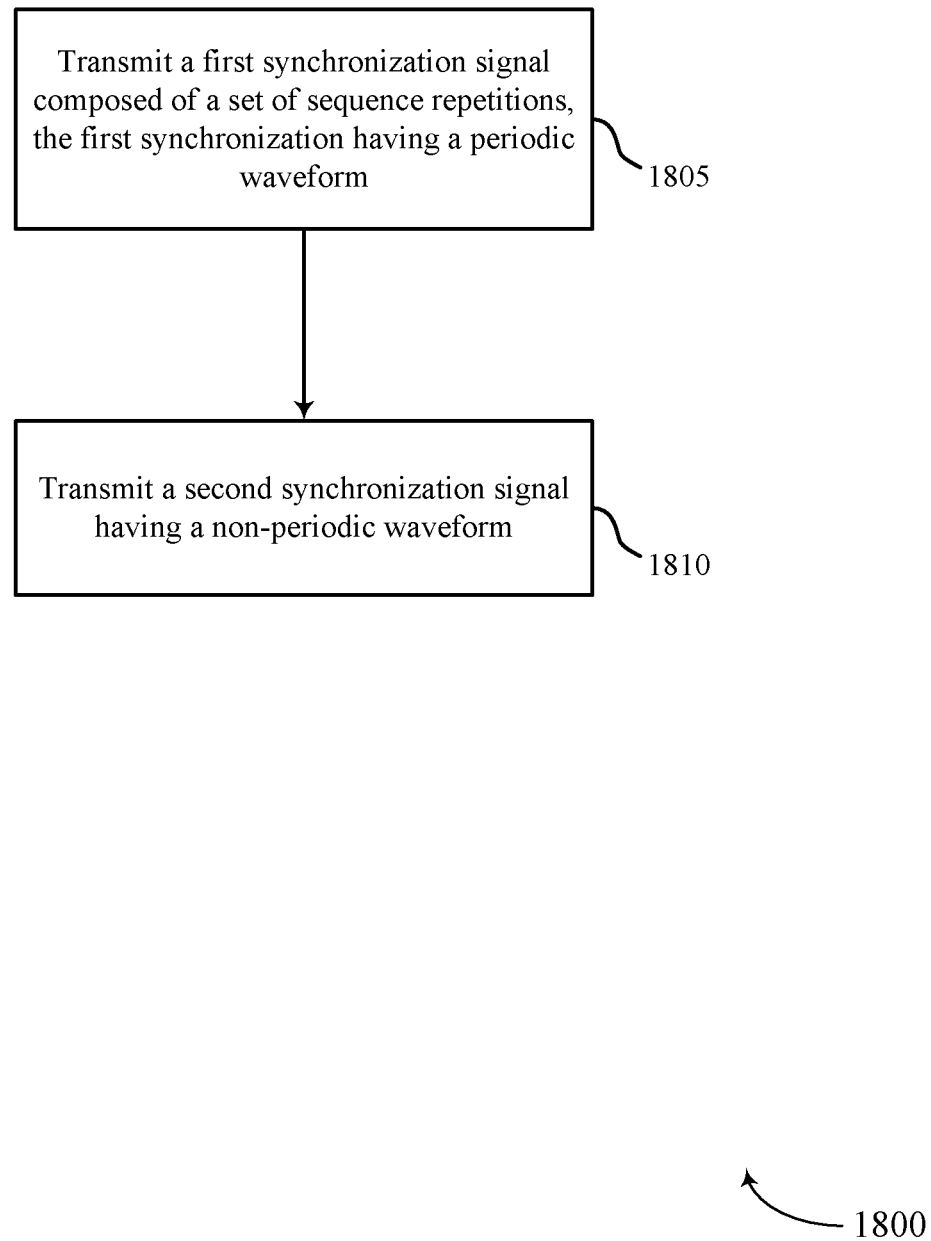

FIG. 18 shows a flowchart illustrating a method 1800 for system scanning and acquisition in accordance with various aspects of the present disclosure. The operations of method 1800 may be implemented by a base station 105 or its components as described with reference to FIGS. 1-13. For example, the operations of method 1800 may be performed by the base station system acquisition module 1010 as described with reference to FIGS. 10-13. In some examples, a base station 105 may execute a set of codes to control the functional elements of the base station 105 to perform the functions described below. Additionally or alternatively, the base station 105 may perform aspects the functions described below using special-purpose hardware.

At block 1805, the base station 105 may transmit a first synchronization signal that is composed of multiple (or a set of) sequence repetitions. The first synchronization signal may have a periodic waveform as described with reference to FIGS. 2-5. In certain examples, the operations of block 1805 may be performed by the BS first synchronization signal module 1105 as described with reference to FIG. 11.

At block 1810, the base station 105 may transmit a second synchronization signal including a non-periodic waveform as described with reference to FIGS. 2-5. In certain examples, the operations of block 1810 may be performed by the BS second synchronization signal module 1110 as described with reference to FIG. 11.

Figure 19:
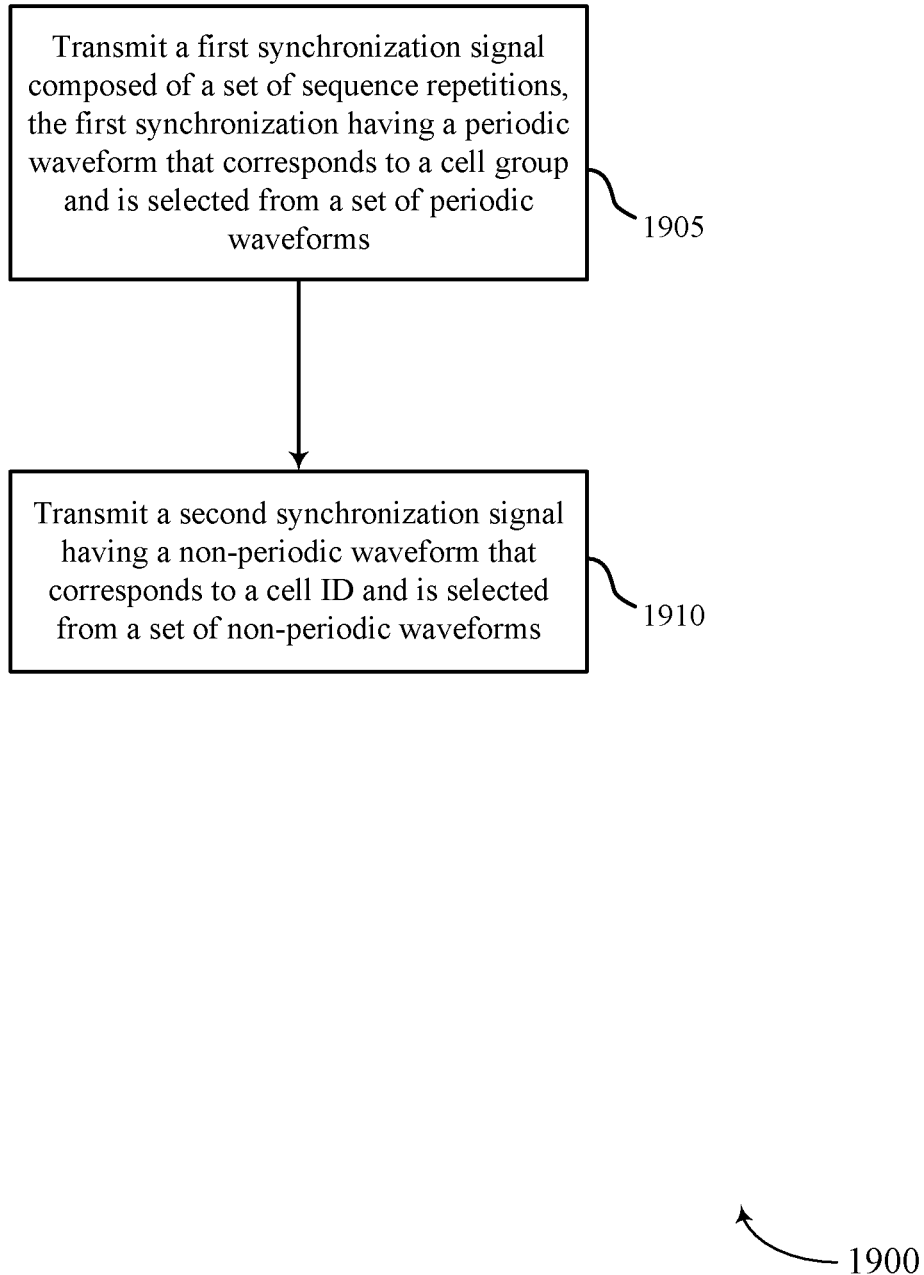

FIG. 19 shows a flowchart illustrating a method 1900 for system scanning and acquisition in accordance with various aspects of the present disclosure. The operations of method 1900 may be implemented by a base station 105 or its components as described with reference to FIGS. 1-13. For example, the operations of method 1900 may be performed by the base station system acquisition module 1010 as described with reference to FIGS. 10-13. In some examples, a base station 105 may execute a set of codes to control the functional elements of the base station 105 to perform the functions described below. Additionally or alternatively, the base station 105 may perform aspects the functions described below using special-purpose hardware. The method 1900 may also incorporate aspects of method 1800 of FIG. 18.

At block 1905, the base station 105 may transmit a first synchronization signal that includes multiple (or a set of) sequence repetitions. The first synchronization signal may have a periodic waveform as described with reference to FIGS. 2-5. In some cases, the periodic waveform of the first synchronization signal corresponds to a cell group and is selected from a set of periodic waveforms. In certain examples, the operations of block 1905 may be performed by the BS first synchronization signal module 1105 as described with reference to FIG. 11.

At block 1910, the base station 105 may transmit a second synchronization signal that has a non-periodic waveform as described with reference to FIGS. 2-5. In some cases, the non-periodic waveform of the second synchronization signal corresponds to a cell ID and is selected from a set of non-periodic waveforms. In certain examples, the operations of block 1910 may be performed by the BS second synchronization signal module 1110 as described with reference to FIG. 11.

Thus, methods 1400, 1500, 1600, 1700, 1800, and 1900 may provide for system scanning and acquisition. It should be noted that methods 1400, 1500, 1600, 1700, 1800, and 1900 describe possible implementations, and that the operations and the steps may be rearranged or otherwise modified such that other implementations are possible. In some examples, aspects from two or more of the methods 1400, 1500, 1600, 1700, 1800, and 1900 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of UMTS that use E-UTRA. UTRA, E-UTRA, UMTS, LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including such networks described herein, the term eNB may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems (e.g., systems 100 and 200) described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or TDD operation (e.g., using unpaired spectrum resources). Frame structures may be defined for frequency division duplex (FDD) (e.g., frame structure type 1) and TDD (e.g., frame structure type 2).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that may be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication, comprising:
   receiving a first synchronization signal comprising a plurality of sequence repetitions;
   identifying a set of candidates for a timing structure boundary based at least in part on the plurality of sequence repetitions; and
   determining the timing structure boundary from the set of candidates based at least in part on a second synchronization signal.

2. The method of claim 1, further comprising:
   identifying a plurality of overlapping accumulation intervals; and
   performing a cumulative correlation for the first synchronization signal for each overlapping accumulation interval of the plurality, wherein the set of candidates is based at least in part on the cumulative correlations.

3. The method of claim 2, wherein each of the cumulative correlations comprises a plurality of coherent correlations associated with the plurality of sequence repetitions.

4. The method of claim 3, wherein the plurality of coherent correlations corresponds to a set of consecutive non-overlapping correlation intervals.

5. The method of claim 2, further comprising:
   determining a phase offset based at least in part on the cumulative correlations, wherein identifying the set of candidates comprises:
   shifting a boundary of each overlapping accumulation interval by the phase offset.

6. The method of claim 2, wherein the set of candidates are determined based at least in part on a magnitude for each of the cumulative correlations.

7. The method of claim 1, further comprising:
   performing a secondary correlation for the second synchronization signal for each timing structure boundary of the set of candidates, wherein the timing structure boundary is determined based at least in part on the secondary correlations.

8. The method of claim 1, wherein each sequence repetition of the plurality of sequence repetitions comprises a same pseudo-random noise (PN) sequence.

9. The method of claim 1, wherein the first synchronization signal comprises a periodic signal.

10. The method of claim 1, wherein the first synchronization signal comprises a primary synchronization signal (PSS).

11. The method of claim 1, wherein the second synchronization signal comprises a non-periodic signal.

12. The method of claim 1, wherein the second synchronization signal comprises at least a portion of a secondary synchronization signal (SSS).

13. The method of claim 1, wherein the second synchronization signal comprises at least a primary synchronization signal (PSS).

14. The method of claim 1, further comprising:
   identifying a cell group based at least in part on the first synchronization signal; and
   identifying a cell identification (ID) based at least in part on the cell group and the second synchronization signal.

15. The method of claim 14, wherein the first synchronization signal comprises a periodic waveform selected from a set of periodic waveforms, and wherein the cell group is identified based at least in part on the periodic waveform.

16. The method of claim 14, wherein the second synchronization signal comprises a non-periodic waveform selected from a set of non-periodic waveforms, and wherein the cell ID is based at least in part on the non-periodic waveform.

17. The method of claim 1, further comprising:
   identifying a cell identification (ID) based at least in part on the second synchronization signal, wherein the first synchronization signal comprises a single frequency network signal.

18. The method of claim 17, wherein the second synchronization signal comprises a non-periodic waveform corresponding to a cell ID and is selected from a set of non-periodic waveforms.

19. The method of claim 1, further comprising:
   receiving a third synchronization signal; and
   determining a cell identification (ID) based at least in part on the third synchronization signal.

20. The method of claim 19, wherein:
   the first synchronization signal comprises a single frequency network signal;
   the second synchronization signal comprises a non-periodic waveform corresponding to a cell group and is selected from a first set of non-periodic waveforms; and
   the third synchronization signal comprises a non-periodic waveform corresponding to a cell ID and is selected from a second set of non-periodic waveforms.

21. A method of wireless communication, comprising:
   transmitting a first synchronization signal comprising a plurality of sequence repetitions, wherein the first synchronization signal comprises a periodic waveform; and
   transmitting a second synchronization signal comprising a non-periodic waveform.

22. The method of claim 21, wherein the periodic waveform of the first synchronization signal corresponds to a cell group and is selected from a set of periodic waveforms, and wherein the non-periodic waveform of the second synchronization signal corresponds to a cell identification (ID) and is selected from a set of non-periodic waveforms.

23. The method of claim 21, wherein the periodic waveform of the first synchronization signal comprises a single frequency network signal, and wherein the non-periodic waveform of the second synchronization signal corresponds to a cell identification (ID) and is selected from a set of non-periodic waveforms.

24. The method of claim 21, further comprising:
transmitting a third synchronization signal comprising a non-periodic waveform, wherein:
the periodic waveform of the first synchronization signal comprises a single frequency network signal;
the non-periodic waveform of the second synchronization signal corresponds to cell group and is selected from a first set of non-periodic waveforms; and
the non-periodic waveform of the third synchronization signal corresponds to a cell identification (ID) and is selected from a second set of non-periodic waveforms.

25. An apparatus for wireless communication, comprising:
means for receiving a first synchronization signal comprising a plurality of sequence repetitions;
means for identifying a set of candidates for a timing structure boundary based at least in part on the plurality of sequence repetitions; and
means for determining the timing structure boundary from the set of candidates based at least in part on a second synchronization signal.

26. The apparatus of claim 25, further comprising:
means for identifying a plurality of overlapping accumulation intervals; and
means for performing a cumulative correlation for the first synchronization signal for each overlapping accumulation interval of the plurality, wherein the set of candidates is based at least in part on the cumulative correlations.

27. The apparatus of claim 26, wherein each of the cumulative correlations comprises a plurality of coherent correlations associated with the plurality of sequence repetitions.

28. The apparatus of claim 27, wherein the plurality of coherent correlations corresponds to a set of consecutive non-overlapping correlation intervals.

29. The apparatus of claim 26, further comprising:
means for determining a phase offset based at least in part on the cumulative correlations, wherein the means for identifying the set of candidates comprises:
means for shifting a boundary of each overlapping accumulation interval by the phase offset.

30. The apparatus of claim 26, wherein the means for identify the set of candidates is operable to determine on a magnitude for each of the cumulative correlations.

31. The apparatus of claim 25, further comprising:
means for performing a secondary correlation for the second synchronization signal for each timing structure boundary of the set of candidates, wherein the means for determining the timing structure boundary is operable to determine the timing structure boundary based at least in part on the secondary correlations.

32. The apparatus of claim 25, wherein each sequence repetition of the plurality of sequence repetitions comprises a same pseudo-random noise (PN) sequence.

33. The apparatus of claim 25, wherein the first synchronization signal comprises a periodic signal.

34. The apparatus of claim 25, wherein the first synchronization signal comprises a primary synchronization signal (PSS).

35. The apparatus of claim 25, wherein the second synchronization signal comprises a non-periodic signal.

36. The apparatus of claim 25, wherein the second synchronization signal comprises at least a portion of a secondary synchronization signal (SSS).

37. The apparatus of claim 25, wherein the second synchronization signal comprises a portion of a primary synchronization signal (PSS).

38. The apparatus of claim 25, further comprising:
means for identifying a cell group based at least in part on the first synchronization signal; and
means for identifying a cell identification (ID) based at least in part on the cell group and the second synchronization signal.

39. The apparatus of claim 38, wherein the first synchronization signal comprises a periodic waveform selected from a set of periodic waveforms, and wherein the means for identifying the cell group is operable to identify the cell group based at least in part on the periodic waveform.

40. The apparatus of claim 38, wherein the second synchronization signal comprises a non-periodic waveform selected from a set of non-periodic waveforms, and wherein the means for identifying the cell ID is operable to identify the cell ID based at least in part on the non-periodic waveform.

41. The apparatus of claim 25, further comprising:
means for identifying a cell identification (ID) based at least in part on the second synchronization signal, wherein the first synchronization signal comprises a single frequency network signal.

42. The apparatus of claim 41, wherein the second synchronization signal comprises a non-periodic waveform corresponding to a cell ID and is selected from a set of non-periodic waveforms.

43. The apparatus of claim 25, further comprising:
means for receiving a third synchronization signal; and
means for determining a cell identification (ID) based at least in part on the third synchronization signal.

44. The apparatus of claim 43, wherein:
the first synchronization signal comprises a single frequency network signal;
the second synchronization signal comprises a non-periodic waveform corresponding to a cell group and is selected from a first set of non-periodic waveforms; and
the third synchronization signal comprises a non-periodic waveform corresponding to a cell ID and is selected from a second set of non-periodic waveforms.

45. An apparatus for wireless communication, comprising:
means for transmitting a first synchronization signal comprising a plurality of sequence repetitions, wherein the first synchronization signal comprises a periodic waveform; and
means for transmitting a second synchronization signal comprising a non-periodic waveform.

46. The apparatus of claim 45, wherein the periodic waveform of the first synchronization signal corresponds to a cell group and is selected from a set of periodic waveforms, and wherein the non-periodic waveform of the second synchronization signal corresponds to a cell identification (ID) and is selected from a set of non-periodic waveforms.

47. The apparatus of claim 45, wherein the periodic waveform of the first synchronization signal comprises a single frequency network signal, and wherein the non-periodic waveform of the second synchronization signal corresponds to a cell identification (ID) and is selected from a set of non-periodic waveforms.

48. The apparatus of claim 45, further comprising:
means for transmitting a third synchronization signal comprising a non-periodic waveform, wherein:
the periodic waveform of the first synchronization signal comprises a single frequency network signal;
the non-periodic waveform of the second synchronization signal corresponds to cell group and is selected from a first set of non-periodic waveforms; and
the non-periodic waveform of the third synchronization signal corresponds to a cell identification (ID) and is selected from a second set of non-periodic waveforms.

49. An apparatus for wireless communication, comprising:
a processor;
memory in electronic communication with the processor; and
instructions stored in the memory and operable, when executed by the processor, to cause the apparatus to:
receive a first synchronization signal comprising a plurality of sequence repetitions;
identify a set of candidates for a timing structure boundary based at least in part on the plurality of sequence repetitions; and
determine the timing structure boundary from the set of candidates based at least in part on a second synchronization signal.

50. The apparatus of claim 49, wherein the instructions are operable to cause the apparatus to:
identify a plurality of overlapping accumulation intervals; and
perform a cumulative correlation for the first synchronization signal for each overlapping accumulation interval of the plurality, wherein the set of candidates is based at least in part on the cumulative correlations.

51. The apparatus of claim 50, wherein each of the cumulative correlations comprises a plurality of coherent correlations associated with the plurality of sequence repetitions.

52. The apparatus of claim 51, wherein the plurality of coherent correlations corresponds to a set of consecutive non-overlapping correlation intervals.

53. The apparatus of claim 50, wherein the instructions are operable to cause the apparatus to:
determine a phase offset based at least in part on the cumulative correlations; and
identify the set of candidates by shifting a boundary of each overlapping accumulation interval by the phase offset.

54. The apparatus of claim 50, wherein the set of candidates are determined based at least in part on a magnitude for each of the cumulative correlations.

55. The apparatus of claim 49, wherein the instructions are operable to cause the apparatus to:
perform a secondary correlation for the second synchronization signal for each timing structure boundary of the set of candidates, wherein the timing structure boundary is determined based at least in part on the secondary correlations.

56. The apparatus of claim 49, wherein each sequence repetition of the plurality of sequence repetitions comprises a same pseudo-random noise (PN) sequence.

57. The apparatus of claim 49, wherein the first synchronization signal comprises a periodic signal.

58. The apparatus of claim 49, wherein the first synchronization signal comprises a primary synchronization signal (PSS).

59. The apparatus of claim 49, wherein the second synchronization signal comprises a non-periodic signal.

60. The apparatus of claim 49, wherein the second synchronization signal comprises at least a portion of a secondary synchronization signal (SSS).

61. The apparatus of claim 49, wherein the second synchronization signal comprises a portion of a primary synchronization signal (PSS).

62. The apparatus of claim 49, wherein the instructions are operable to cause the apparatus to:
identify a cell group based at least in part on the first synchronization signal; and
identify a cell identification (ID) based at least in part on the cell group and the second synchronization signal.

63. The apparatus of claim 62, wherein the first synchronization signal comprises a periodic waveform selected from a set of periodic waveforms, and wherein the cell group is identified based at least in part on the periodic waveform.

64. The apparatus of claim 62, wherein the second synchronization signal comprises a non-periodic waveform selected from a set of non-periodic waveforms, and wherein the cell ID is based at least in part on the non-periodic waveform.

65. The apparatus of claim 49, wherein the instructions are operable to cause the apparatus to:
identify a cell identification (ID) based at least in part on the second synchronization signal wherein the first synchronization signal comprises a single frequency network signal.

66. The apparatus of claim 65, wherein the second synchronization signal comprises a non-periodic waveform corresponding to a cell ID and is selected from a set of non-periodic waveforms.

67. The apparatus of claim 49, wherein the instructions are operable to cause the apparatus to:
receive a third synchronization signal; and
determine a cell identification (ID) based at least in part on the third synchronization signal.

68. The apparatus of claim 67, wherein:
the first synchronization signal comprises a single frequency network signal;
the second synchronization signal comprises a non-periodic waveform corresponding to a cell group and is selected from a first set of non-periodic waveforms; and
the third synchronization signal comprises a non-periodic waveform corresponding to a cell ID and is selected from a second set of non-periodic waveforms.

69. An apparatus for wireless communication, comprising:
a processor;
memory in electronic communication with the processor; and
instructions stored in the memory and operable, when executed by the processor, to cause the apparatus to:
transmit a first synchronization signal comprising a plurality of sequence repetitions, wherein the first synchronization signal comprises a periodic waveform; and
transmit a second synchronization signal comprising a non-periodic waveform.

70. The apparatus of claim 69, wherein the periodic waveform of the first synchronization signal corresponds to a cell group and is selected from a set of periodic waveforms, and wherein the non-periodic waveform of the second synchronization signal corresponds to a cell identification (ID) and is selected from a set of non-periodic waveforms.

71. The apparatus of claim 69, wherein the periodic waveform of the first synchronization signal comprises a single frequency network signal, and wherein the non-periodic waveform of the second synchronization signal corresponds to a cell identification (ID) and is selected from a set of non-periodic waveforms.

72. The apparatus of claim 69, wherein the instructions are operable to cause the apparatus to:
    transmit a third synchronization signal comprising a non-periodic waveform, wherein:
        the periodic waveform of the first synchronization signal comprises a single frequency network signal;
        the non-periodic waveform of the second synchronization signal corresponds to cell group and is selected from a first set of non-periodic waveforms; and
        the non-periodic waveform of the third synchronization signal corresponds to a cell identification (ID) and is selected from a second set of non-periodic waveforms.

73. A non-transitory computer-readable medium storing code for wireless communication, the code comprising instructions executable to:
    receive a first synchronization signal comprising a plurality of sequence repetitions;
    identify a set of candidates for a timing structure boundary based at least in part on the plurality of sequence repetitions; and
    determine the timing structure boundary from the set of candidates based at least in part on a second synchronization signal.

74. A non-transitory computer-readable medium storing code for wireless communication, the code comprising instructions executable to:
    transmit a first synchronization signal comprising a plurality of sequence repetitions, wherein the first synchronization signal comprises a periodic waveform; and
    transmit a second synchronization signal comprising a non-periodic waveform.

\* \* \* \* \*